US012808412B2

(12) United States Patent
Osada et al.

(10) Patent No.: US 12,808,412 B2
(45) Date of Patent: Nov. 24, 2026

(54) DISC BRAKE, BRAKE CALIPER, METHOD FOR CASTING BRAKE CALIPER, BRAKE CARRIER, AND METHOD FOR CASTING BRAKE CARRIER

(71) Applicant: HITACHI ASTEMO, LTD., Ibaraki (JP)

(72) Inventors: Takahito Osada, Hitachinaka (JP); Kimiyasu Kono, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 695 days.

(21) Appl. No.: 18/266,415

(22) PCT Filed: Dec. 9, 2021

(86) PCT No.: PCT/JP2021/045397
§ 371 (c)(1),
(2) Date: Jun. 9, 2023

(87) PCT Pub. No.: WO2022/131134
PCT Pub. Date: Jun. 23, 2022

(65) Prior Publication Data

US 2024/0102523 A1 Mar. 28, 2024

(30) Foreign Application Priority Data

Dec. 18, 2020 (JP) ................................ 2020-210469

(51) Int. Cl.
*F16D 65/02* (2006.01)
*F16D 65/00* (2006.01)

(52) U.S. Cl.
CPC ......... *F16D 65/0068* (2013.01); *F16D 65/02* (2013.01); *F16D 2065/13* (2013.01); *F16D 2250/0007* (2013.01)

(58) Field of Classification Search
CPC .. F16D 65/0068; F16D 65/02; F16D 2065/13; F16D 2250/0007
(Continued)

(56) References Cited

U.S. PATENT DOCUMENTS 4,410,070 A * 10/1983 Hagiwara ........... F16D 65/0006 188/73.31
4,775,034 A * 10/1988 Pachner ................ F16D 55/227 188/73.39
(Continued)

FOREIGN PATENT DOCUMENTS

EP 3 943 774 A1 1/2022
JP 2004-278730 A 10/2004
(Continued)

OTHER PUBLICATIONS

International Search Report received in corresponding International Application No. PCT/JP2021/045397 dated Feb. 15, 2022.
(Continued)

*Primary Examiner* — Christopher P Schwartz
(74) *Attorney, Agent, or Firm* — Mattingly & Malur, PC

(57) ABSTRACT

Provided is a disc brake including a brake caliper. The brake caliper has a first bridge part positioned on a first pin disposition part side and on which a sprue mark formed at the time of casting a caliper main body part is provided, and a second bridge part positioned on a second pin disposition part side. The brake caliper has a shape in which a moment of inertia of area of the caliper main body part on the first bridge part side is larger than a moment of inertia of area of the caliper main body part on the second bridge part side when the caliper main body part is divided by a straight line that bisects a line segment connecting a center of the first pin disposition part and a center of the second pin disposition part when viewed from an axial direction of a disc.

13 Claims, 16 Drawing Sheets

(58) Field of Classification Search
USPC ..................... 188/73.36, 73.39, 73.45, 73.47
See application file for complete search history.

(56) References Cited

U.S. PATENT DOCUMENTS

| | | | | |
|---|---|---|---|---|
| 5,036,932 | A * | 8/1991 | Schonenberger | F16D 55/226<br>188/73.37 |
| 6,135,246 | A * | 10/2000 | Gautier | F16D 55/227<br>188/73.39 |
| 11,708,875 | B2 * | 7/2023 | Redemann | F16D 55/226<br>188/73.43 |
| 12,066,066 | B2 * | 8/2024 | Shiraishi | F16D 65/0977 |
| 2023/0205946 | A1 * | 6/2023 | Shahin | G06F 30/20<br>703/1 |

FOREIGN PATENT DOCUMENTS

| | | | | |
|---|---|---|---|---|
| JP | 2008-540127 | A | 11/2008 | |
| JP | 2017214962 | A * | 12/2017 | F16D 65/02 |
| WO | 2006/119554 | A1 | 11/2006 | |
| WO | 2020/189356 | A1 | 9/2020 | |

OTHER PUBLICATIONS

Written Opinion received in corresponding International Application No. PCT/JP2021/045397 dated Feb. 15, 2022.
Indian Office Action received in corresponding Indian Application No. 202317039671 dated Jul. 31, 2026.

* cited by examiner

DISC BRAKE, BRAKE CALIPER, METHOD FOR CASTING BRAKE CALIPER, BRAKE CARRIER, AND METHOD FOR CASTING BRAKE CARRIER

TECHNICAL FIELD

The present invention relates to a disc brake, a brake caliper, a method for casting a brake caliper, a brake carrier, and a method for casting a brake carrier. Priority is claimed on Japanese Patent Application No. 2020-210469 filed on Dec. 18, 2020, the content of which is incorporated herein by reference.

BACKGROUND ART

There is a technology of adjusting rigidity by casting an insert into a cast part (see, for example, Patent Document 1).

CITATION LIST

Patent Document

Patent Document 1

Published Japanese Translation No. 2008-540127 of the PCT International Publication

SUMMARY OF INVENTION

Technical Problem

In disc brakes, it is desired that an increase in costs be curbed.

An objective of the present invention is to provide a disc brake, a brake caliper, a method for casting a brake caliper, a brake carrier, and a method for casting a brake carrier in which an increase in costs can be curbed.

Solution to Problem

A first aspect of a disc brake according to the present invention includes a brake carrier fixed to a non-rotating portion of a vehicle and provided across an outer circumferential side of a disc, a first friction pad provided to be movable in the brake carrier and disposed to face one surface of the disc in an axial direction, a second friction pad provided to be movable in the brake carrier and disposed to face the other surface of the disc in the axial direction, and a brake caliper, which is a brake caliper in which a piston pressing the first friction pad is accommodated in the axial direction of the disc, including a first slide pin, a second slide pin, and a caliper main body part supported by the brake carrier via the first slide pin and the second slide pin, in which the caliper main body part has a cylinder part having a cylinder hole in which the piston is accommodated, a first pin disposition part provided on one end side of the cylinder part in a circumferential direction of the disc and having the first slide pin provided in the axial direction of the disc, a second pin disposition part provided on the other end side of the cylinder part in the circumferential direction of the disc and having the second slide pin provided in the axial direction of the disc, a first bridge part provided across an outer circumferential side of the disc, positioned on the first pin disposition part side in the circumferential direction of the disc, and on which a sprue mark formed at the time of casting the caliper main body part is provided, and a second bridge part provided across an outer circumferential side of the disc and positioned on the second pin disposition part side in the circumferential direction of the disc, and has a shape in which a moment of inertia of area of the caliper main body part on the first bridge part side is larger than a moment of inertia of area of the caliper main body part on the second bridge part side when the caliper main body part is divided by a straight line that bisects a line segment connecting a center of the first pin disposition part and a center of the second pin disposition part when viewed from the axial direction of the disc.

A second aspect of the disc brake according to the present invention includes a brake carrier fixed to a non-rotating portion of a vehicle and provided across an outer circumferential side of a disc, a first friction pad provided to be movable in the brake carrier and disposed to face one surface of the disc in an axial direction, a second friction pad provided to be movable in the brake carrier and disposed to face the other surface of the disc in the axial direction, and a brake caliper, which is a brake caliper in which a piston pressing the first friction pad is accommodated in the axial direction of the disc, including a first slide pin, a second slide pin, and a caliper main body part supported by the brake carrier via the first slide pin and the second slide pin, in which the caliper main body part has a cylinder part having a cylinder hole in which the piston is accommodated, a first pin disposition part provided on one end side of the cylinder part in a circumferential direction of the disc and having the first slide pin provided in the axial direction of the disc, a second pin disposition part provided on the other end side of the cylinder part in the circumferential direction of the disc and having the second slide pin provided in the axial direction of the disc, a first bridge part provided across an outer circumferential side of the disc, positioned on the first pin disposition part side in the circumferential direction of the disc, and on which a sprue mark formed at the time of casting the caliper main body part is provided, and a second bridge part provided across an outer circumferential side of the disc and positioned on the second pin disposition part side in the circumferential direction of the disc, and has a shape in which a cross-sectional area of the caliper main body part on the second bridge part side is larger than a cross-sectional area of the caliper main body part on the first bridge part side when the caliper main body part is divided by a straight line that bisects a line segment connecting a center of the first pin disposition part and a center of the second pin disposition part when viewed from the axial direction of the disc.

A first aspect of a brake caliper according to the present invention is a brake caliper pressing a friction pad to a disc, and the brake caliper includes a first slide pin, a second slide pin, and a caliper main body part, in which the caliper main body part has a cylinder part having a cylinder hole in which a piston is accommodated, a first pin disposition part provided on one end side of the cylinder part in a circumferential direction of the disc and having the first slide pin provided in an axial direction of the disc, a second pin disposition part provided on the other end side of the cylinder part in the circumferential direction of the disc and having the second slide pin provided in the axial direction of the disc, a first bridge part provided across an outer circumferential side of the disc, positioned on the first pin disposition part side in the circumferential direction of the disc, and on which a sprue mark formed at the time of casting the caliper main body part is provided, and a second bridge part provided across an outer circumferential side of the disc and positioned on the second pin disposition part side in the circumferential direction of the disc, and has a shape in which a moment of inertia of area of the caliper main body part on the first bridge part side is larger than a moment of inertia of area of the caliper main body part on the second bridge part side when the caliper main body part is divided by a straight line that bisects a line segment connecting a center of the first pin disposition part and a center of the second pin disposition part when viewed from the axial direction of the disc.

A second aspect of the brake caliper according to the present invention is a brake caliper pressing a friction pad to a disc, and the brake caliper includes a first slide pin, a second slide pin, and a caliper main body part, in which the caliper main body part has a cylinder part having a cylinder hole in which a piston is accommodated, a first pin disposition part provided on one end side of the cylinder part in a circumferential direction of the disc and having the first slide pin provided in the axial direction of the disc, a second pin disposition part provided on the other end side of the cylinder part in the circumferential direction of the disc and having the second slide pin provided in the axial direction of the disc, a first bridge part provided across an outer circumferential side of the disc, positioned on the first pin disposition part side in the circumferential direction of the disc, and on which a sprue mark formed at the time of casting the caliper main body part is provided, and a second bridge part provided across an outer circumferential side of the disc and positioned on the second pin disposition part side in the circumferential direction of the disc, and has a shape in which a cross-sectional area of the caliper main body part on the second bridge part side is larger than a cross-sectional area of the caliper main body part on the first bridge part side when the caliper main body part is divided by a straight line that bisects a line segment connecting a center of the first pin disposition part and a center of the second pin disposition part when viewed from the axial direction of the disc.

A first aspect of a method for casting a brake caliper according to the present invention is a method for casting a brake caliper pressing a friction pad to a disc, and the method includes a first step, and a second step, in which the first step is a step of preparing a mold for a caliper main body part which is a caliper main body part including a cylinder part having a cylinder hole in which a piston is accommodated, a first pin disposition part provided on one end side of the cylinder part in a circumferential direction of the disc and having a first slide pin provided in an axial direction of the disc, a second pin disposition part provided on the other end side of the cylinder part in the circumferential direction of the disc and having a second slide pin provided in the axial direction of the disc, a first bridge part provided across an outer circumferential side of the disc and positioned on the first pin disposition part side in the circumferential direction of the disc, and a second bridge part provided across an outer circumferential side of the disc and positioned on the second pin disposition part side in the circumferential direction of the disc, and having a shape in which a moment of inertia of area of the caliper main body part on the first bridge part side is larger than a moment of inertia of area of the caliper main body part on the second bridge part side when the caliper main body part is divided by a straight line that bisects a line segment connecting a center of the first pin disposition part and a center of the second pin disposition part when viewed from the axial direction of the disc, and the second step is a step of pouring a molten metal into the mold from the first bridge part side.

A second aspect of the method for casting a brake caliper according to the present invention is a method for casting a brake caliper pressing a friction pad to a disc, and the method includes a first step, and a second step, in which the first step is a step of preparing a mold for a caliper main body part which is a caliper main body part including a cylinder part having a cylinder hole in which a piston is accommodated, a first pin disposition part provided on one end side of the cylinder part in a circumferential direction of the disc and having a first slide pin provided in an axial direction of the disc, a second pin disposition part provided on the other end side of the cylinder part in the circumferential direction of the disc and having a second slide pin provided in the axial direction of the disc, a first bridge part provided across an outer circumferential side of the disc and positioned on the first pin disposition part side in the circumferential direction of the disc, and a second bridge part provided across an outer circumferential side of the disc and positioned on the second pin disposition part side in the circumferential direction of the disc, and having a shape in which a cross-sectional area of the caliper main body part on the second bridge part side is larger than a cross-sectional area of the caliper main body part on the first bridge part side when the caliper main body part is divided by a straight line that bisects a line segment connecting a center of the first pin disposition part and a center of the second pin disposition part when viewed from the axial direction of the disc, and the second step is a step of pouring a molten metal into the mold from the first bridge part side.

A third aspect of the disc brake according to the present invention includes a brake caliper including a first friction pad disposed to face one surface of a disc in an axial direction, a second friction pad disposed to face the other surface of the disc in the axial direction, and a caliper main body part in which a first slide pin, a second slide pin, and a piston which presses the first friction pad are accommodated in the axial direction of the disc, in which the caliper main body part has a cylinder part having a cylinder hole in which the piston is accommodated, a first pin disposition part provided on one end side of the cylinder part in a circumferential direction of the disc and having the first slide pin provided in the axial direction of the disc, and a second pin disposition part provided on the other end side of the cylinder part in the circumferential direction of the disc and having the second slide pin provided in the axial direction of the disc, and a brake carrier, which is a brake carrier having the first friction pad and the second friction pad to be movable, fixed to a non-rotating portion of a vehicle, and provided across an outer circumferential side of the disc, including a first fixing part provided to face the one surface and configured to fix the brake carrier to the non-rotating portion of the vehicle, a second fixing part provided to face the one surface and configured to fix the brake carrier to the non-rotating portion of the vehicle, a first connection part extending in a direction of the first pin disposition part from the first fixing part in a plane perpendicular to the axial direction of the disc and on which a sprue mark formed at the time of casting the brake carrier is provided, and a second connection part extending in a direction of the second pin disposition part from the second fixing part in a plane perpendicular to the axial direction of the disc, and having a shape in which a moment of inertia of area of the first connection part is larger than a moment of inertia of area of the second connection part.

A fourth aspect of the disc brake according to the present invention includes a brake caliper including a first friction pad disposed to face one surface of a disc in an axial direction, a second friction pad disposed to face the other surface of the disc in the axial direction, and a caliper main body part in which a first slide pin, a second slide pin, and a piston which presses the first friction pad are accommodated in the axial direction of the disc, in which the caliper main body part has a cylinder part having a cylinder hole in which the piston is accommodated, a first pin disposition part provided on one end side of the cylinder part in a circumferential direction of the disc and having the first slide pin provided in the axial direction of the disc, and a second pin disposition part provided on the other end side of the cylinder part in the circumferential direction of the disc and having the second slide pin provided in the axial direction of the disc, and a brake carrier, which is a brake carrier having the first friction pad and the second friction pad to be movable, fixed to a non-rotating portion of a vehicle, and provided across an outer circumferential side of the disc, including a first fixing part provided to face the one surface and configured to fix the brake carrier to the non-rotating portion of the vehicle, a second fixing part provided to face the one surface and configured to fix the brake carrier to the non-rotating portion of the vehicle, a first connection part extending in a direction of the first pin disposition part from the first fixing part in a plane perpendicular to the axial direction of the disc and on which a sprue mark formed at the time of casting the brake carrier is provided, and a second connection part extending in a direction of the second pin disposition part from the second fixing part in a plane perpendicular to the axial direction of the disc, and having a shape in which a cross-sectional area of the second connection part is larger than a cross-sectional area of the first connection part.

A first aspect of a brake carrier according to the present invention is a brake carrier having a first friction pad disposed to face one surface of a disc in an axial direction and a second friction pad disposed to face the other surface of the disc in the axial direction to be movable, fixed to a non-rotating portion of a vehicle, and provided across an outer circumferential side of the disc, and the brake carrier includes a first fixing part provided to face the one surface and configured to fix the brake carrier to the non-rotating portion of the vehicle, a second fixing part provided to face the one surface and configured to fix the brake carrier to the non-rotating portion of the vehicle, a first connection part extending from the first fixing part in a plane perpendicular to the axial direction of the disc and on which a sprue mark formed at the time of casting the brake carrier is provided, and a second connection part extending from the second fixing part in a plane perpendicular to the axial direction of the disc, and has a shape in which a moment of inertia of area of the first connection part is larger than a moment of inertia of area of the second connection part.

A second aspect of the brake carrier according to the present invention is a brake carrier having a first friction pad disposed to face one surface of a disc in an axial direction and a second friction pad disposed to face the other surface of the disc in the axial direction to be movable, fixed to a non-rotating portion of a vehicle, and provided across an outer circumferential side of the disc, and the brake carrier includes a first fixing part provided to face the one surface and configured to fix the brake carrier to the non-rotating portion of the vehicle, a second fixing part provided to face the one surface and configured to fix the brake carrier to the non-rotating portion of the vehicle, a first connection part extending from the first fixing part in a plane perpendicular to the axial direction of the disc and on which a sprue mark formed at the time of casting the brake carrier is provided, and a second connection part extending from the second fixing part in a plane perpendicular to the axial direction of the disc, and has a shape in which a cross-sectional area of the second connection part is larger than a cross-sectional area of the first connection part.

A first aspect of a method for casting a brake carrier according to the present invention is a method for casting a brake carrier having a first friction pad disposed to face one surface of a disc in an axial direction and a second friction pad disposed to face the other surface of the disc in the axial direction to be movable, fixed to a non-rotating portion of a vehicle, and provided across an outer circumferential side of the disc, and the method includes a first step, and a second step, in which the first step is a step of preparing a mold for a brake carrier which is a brake carrier including a first fixing part provided to face the one surface and configured to fix the brake carrier to the non-rotating portion of the vehicle, a second fixing part provided to face the one surface and configured to fix the brake carrier to the non-rotating portion of the vehicle, a first connection part extending from the first fixing part in a plane perpendicular to the axial direction of the disc and on which a sprue mark formed at the time of casting the brake carrier is provided, and a second connection part extending from the second fixing part in a plane perpendicular to the axial direction of the disc, and having a shape in which a moment of inertia of area of the first connection part is larger than a moment of inertia of area of the second connection part, and the second step is a step of pouring a molten metal into the mold from the first connection part side.

A second aspect of the method for casting a brake carrier according to the present invention is a method for casting a brake carrier having a first friction pad disposed to face one surface of a disc in an axial direction and a second friction pad disposed to face the other surface of the disc in the axial direction to be movable, fixed to a non-rotating portion of a vehicle, and provided across an outer circumferential side of the disc, and the method includes a first step, and a second step, in which the first step is a step of preparing a mold for a brake carrier which is a brake carrier including a first fixing part provided to face the one surface and configured to fix the brake carrier to the non-rotating portion of the vehicle, a second fixing part provided to face the one surface and configured to fix the brake carrier to the non-rotating portion of the vehicle, a first connection part extending from the first fixing part in a plane perpendicular to the axial direction of the disc and on which a sprue mark formed at the time of casting the brake carrier is provided, and a second connection part extending from the second fixing part in a plane perpendicular to the axial direction of the disc, and having a shape in which a cross-sectional area of the second connection part is larger than a cross-sectional area of the first connection part, and the second step is a step of pouring a molten metal into the mold from the first connection part side.

Advantageous Effects of Invention

According to each aspect of the present invention, it is possible to curb an increase in costs.

DESCRIPTION OF EMBODIMENTS

First Embodiment

Figure 1:
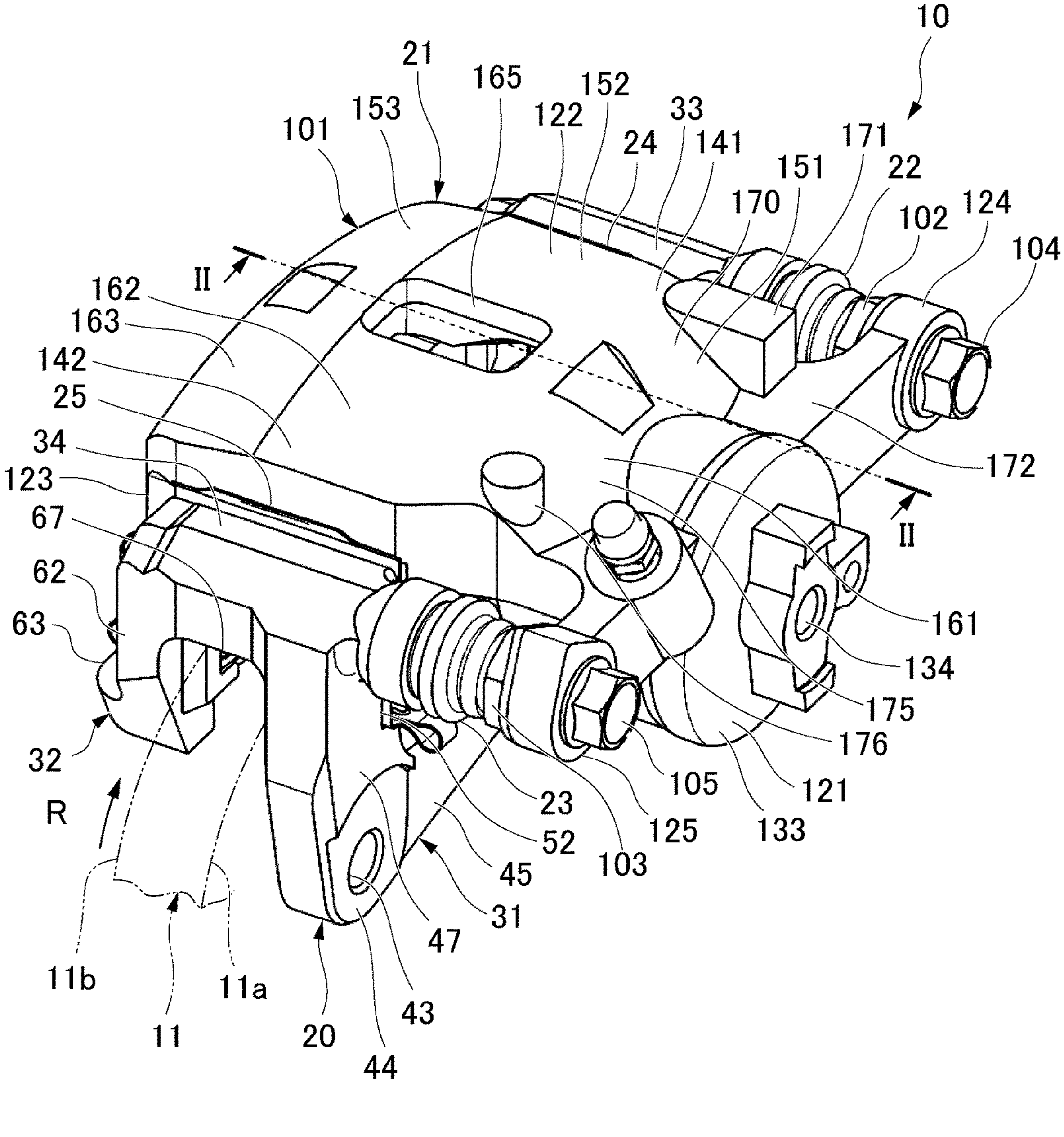
FIG. 1 is a perspective view illustrating a disc brake according to a first embodiment.
Figure 2:
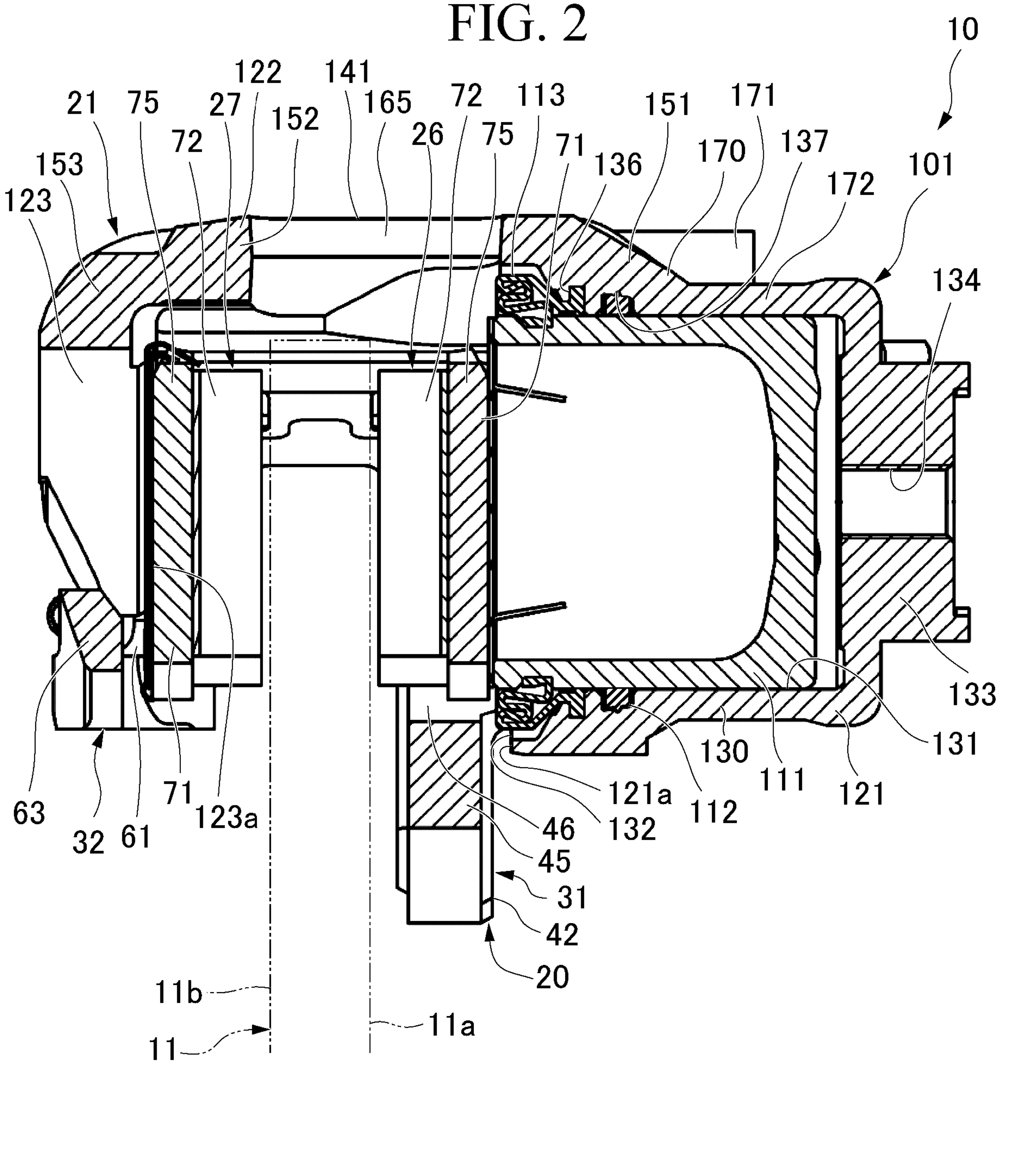
FIG. 2 is a cross-sectional view along line II-II of FIG. 1, illustrating the disc brake of the first embodiment.

A first embodiment will be described below with reference to FIGS. 1 to 7. A disc brake 10 of the first embodiment illustrated in FIGS. 1 and 2 is for a vehicle such as an automobile and applies a braking force to a vehicle. The disc brake 10 is specifically used for braking a four-wheeled vehicle. The disc brake 10 brakes a vehicle by stopping rotation of a disc-shaped disc 11 that rotates together with a wheel (not illustrated).

As illustrated in FIG. 1, the disc brake 10 includes a brake carrier 20, a brake caliper 21, a pair of first pin boot 22 and second pin boot 23, and a pair of first pad spring 24 and second pad spring 25. Also, the disc brake 10 includes a pair of first friction pad 26 and second friction pad 27 as illustrated in FIG. 2.

Hereinafter, a central axis of the disc 11 is referred to as a disc axis, a direction in which the disc axis extends is referred to as a disc axial direction. Also, a radial direction of the disc 11 in the disc brake 10 is referred to as a disc radial direction, and a circumferential direction of the disc 11 in the disc brake 10, that is, a rotation direction thereof, is referred to as a disc circumferential direction. Also, a center side of the disc 11 in the disc radial direction is referred to as a disc radial direction inner side, and a side opposite to the center of the disc 11 in the disc radial direction is referred to as a disc radial direction outer side. Also, a center side of the brake carrier 20 and the brake caliper 21 in the disc circumferential direction is referred to as a disc circumferential direction inner side, and a side opposite to the center of the brake carrier 20 and the brake caliper 21 in the disc circumferential direction is referred to as a disc circumferential direction outer side. Also, a line passing through the disc axis and the center of the brake carrier 20 and the brake caliper 21 in the disc circumferential direction and extending in the disc radial direction is referred to as a radial direction reference line. The radial direction reference line is perpendicular to the disc axis. Also, a plane including the radial direction reference line and the disc axis is referred to as a radial direction reference plane. Also, an outer side in a vehicle width direction of the vehicle in which the disc brake 10 is provided is referred to as an outer side, and an inner side thereof is referred to as an inner side. Also, an outlet side of the disc 11 in the disc brake 10 in a rotation direction R of the disc 11 when the vehicle in which the disc brake is provided travels forward is referred to as a disc rotation exit side, and an inlet side of the disc 11 in the disc brake 10 in the rotation direction R of the disc 11 when the vehicle similarly travels forward is referred to as a disc rotation entry side.

As illustrated in FIG. 1, the brake carrier 20 is fixed to a non-rotating portion of the vehicle while being provided across an outer circumferential side of the disc 11. The brake carrier 20 includes an inner disposition part 31, an outer disposition part 32, and a pair of first connection part 33 and second connection part 34 that connect them. The brake carrier 20 has a substantially mirror-symmetrical shape with respect to the radial direction reference plane. In other words, the radial direction reference plane passes through a center position of the brake carrier 20 in the disc circumferential direction.

The inner disposition part 31 is disposed on one side of the disc 11 in the disc axial direction and attached to a non-rotating portion of the vehicle. Here, the non-rotating portion of the vehicle to which the brake carrier 20 is attached is disposed on an inner side of the disc 11, and the inner disposition part 31 attached to the non-rotating portion is also disposed on the inner side of the disc 11. The inner disposition part 31 is disposed on the inner side of the disc 11 and faces an inner surface 11*a* which is on one side of the disc 11. The inner disposition part 31 supports the first friction pad 26 illustrated in FIG. 2. Similarly to the inner disposition part 31, the first friction pad 26 is also disposed on the inner side of the disc 11 and faces the surface 11*a* of the disc 11 on the inner side.

The outer disposition part 32 is disposed on an outer side which is the other side of the disc 11 in the disc axial direction. The outer disposition part 32 is disposed on an outer side of the disc 11 and faces an outer surface 11*b* which is on the other side of the disc 11. The outer disposition part 32 supports the second friction pad 27. Similarly to the outer disposition part 32, the second friction pad 27 is also disposed on the outer side of the disc 11 and faces the surface 11*b* of the disc 11 on the outer side.

As illustrated in FIG. 1, the first connection part 33 and the second connection part 34 extend in the disc axial direction and are provided across the outer circumferential side of the disc 11 in the disc axial direction. The first connection part 33 connects end portions of the inner disposition part 31 and the outer disposition part 32 on the outer side in the disc radial direction and on the same one side in the disc circumferential direction. The second connection part 34 connects end portions of the inner disposition part 31 and the outer disposition part 32 on the outer side in the disc radial direction and on the same the other side in the disc circumferential direction.

Figure 3:
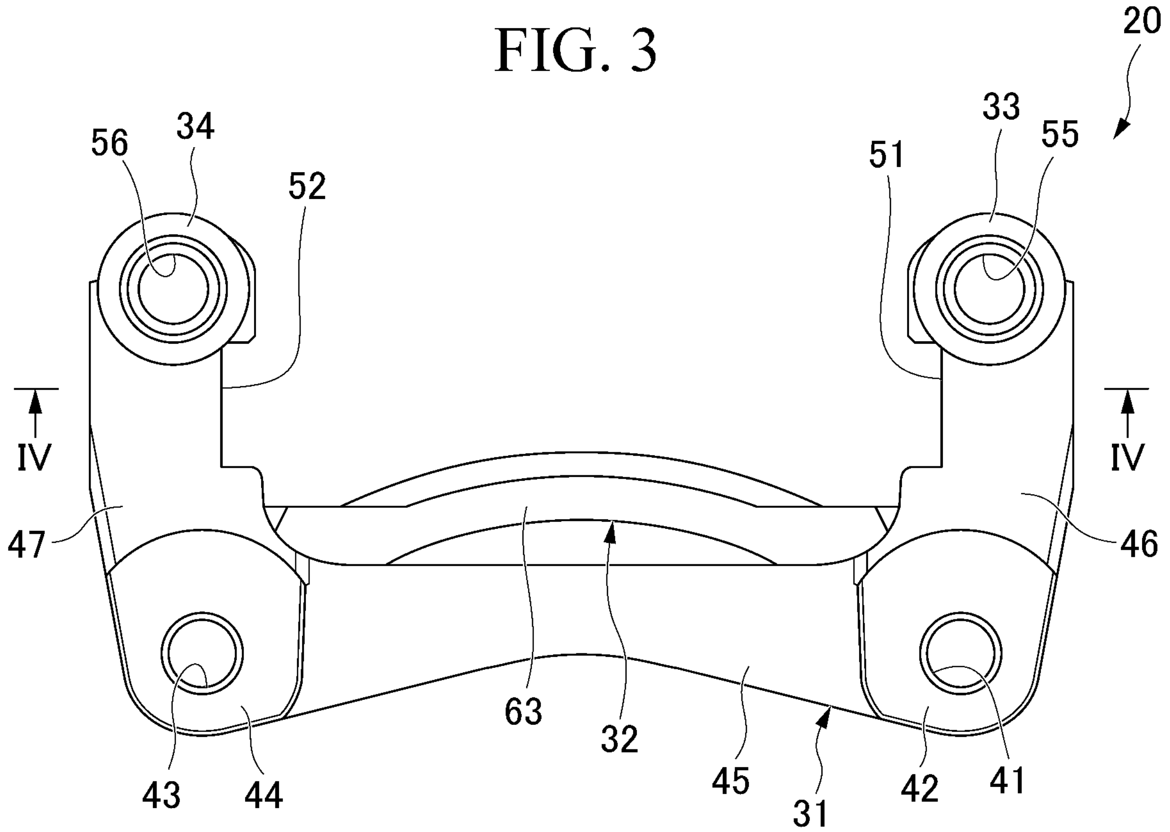
FIG. 3 is a rear view illustrating a brake carrier of the disc brake of the first embodiment.

As illustrated in FIG. 3, the inner disposition part 31 includes a first fixing part 42 having a screw hole 41, a second fixing part 44 having a screw hole 43, and an inner beam part 45 (beam part) connecting the first fixing part 42 and the second fixing part 44. Also, the inner disposition part 31 includes a first connection part 46 extending from the first fixing part 42 and a second connection part 47 extending from the second fixing part 44. The first fixing part 42, the second fixing part 44, the inner beam part 45, the first connection part 46 and the second connection part 47 are disposed on the inner side with respect to the disc 11. The inner disposition part 31 faces the inner surface 11*a* which is on one side of the disc 11.

The first fixing part 42 is provided on one end side of the inner disposition part 31 in the disc circumferential direction, and the second fixing part 44 is provided on the other end side of the inner disposition part 31 in the disc circumferential direction. The inner beam part 45 extends in the disc circumferential direction. The screw hole 41 is bored through the first fixing part 42 in the disc axial direction. The screw hole 43 is bored through the second fixing part 44 in the disc axial direction. In the brake carrier 20, the first fixing part 42 is disposed on the disc rotation exit side, and the second fixing part 44 is disposed on the disc rotation entry side. In a state in which the first fixing part 42 and the second fixing part 44 are abutted against a mounting portion (not illustrated) that is of a non-rotating portion of the vehicle, the brake carrier 20 is mounted on the mounting portion by bolts that are screwed into the screw holes 41 and 43. In other words, the first fixing part 42 and the second fixing part 44 fix the brake carrier 20 to the non-rotating portion of the vehicle. The first fixing part 42 and the second fixing part 44 fixed to the non-rotating portion of the vehicle are aligned with each other in position in the disc axial direction. The inner beam part 45 overlaps the first fixing part 42 and the second fixing part 44 in position in the disc axial direction.

The first connection part 46 overlaps the first fixing part 42 in position in the disc axial direction and extends toward the disc radial direction outer side from the first fixing part 42. The second connection part 47 overlaps the second fixing part 44 in position in the disc axial direction and extends toward the disc radial direction outer side from the second fixing part 44. The first connection part 46 includes a first recessed part 51 formed to have a shape recessed outward in the disc circumferential direction from an inner surface thereof facing the disc circumferential direction inner side. The second connection part 47 includes a second recessed part 52 formed to have a shape recessed outward in the disc circumferential direction from an inner surface thereof facing the disc circumferential direction inner side. Therefore, the first recessed part 51 and the second recessed part 52 face each other in the disc circumferential direction, and form recessed shapes that are recessed in a direction away from each other in the disc circumferential direction. The first recessed part 51 penetrates the first connection part 46 in the disc axial direction. The second recessed part 52 penetrates the second connection part 47 in the disc axial direction.

The first connection part 33 is positioned on one side of the inner disposition part 31 in the disc circumferential direction. The first connection part 33 extends toward the outer side in the disc axial direction from an end portion of the first connection part 46 on the disc radial direction outer side. The first connection part 33 extends across the disc radial direction outer side with respect to the outer circumferential surface of the disc 11. The second connection part 34 is positioned on the other side of the inner disposition part 31 in the disc circumferential direction. The second connection part 34 extends toward the outer side in the disc axial direction from an end portion of the second connection part 47 on the disc radial direction outer side. The second connection part 34 extends across the disc radial direction outer side with respect to the outer circumferential surface of the disc 11.

A first pin insertion hole 55 extending in the disc axial direction is formed in the first connection part 33. The first pin insertion hole 55 is formed from an end surface on the inner side of the first connection part 33 to an intermediate position within the first connection part 33. A second pin insertion hole 56 extending in the disc axial direction is formed in the second connection part 34. The second pin insertion hole 56 is formed from an end surface on the inner side of the second connection part 34 to an intermediate position within the second connection part 34.

Figure 4:
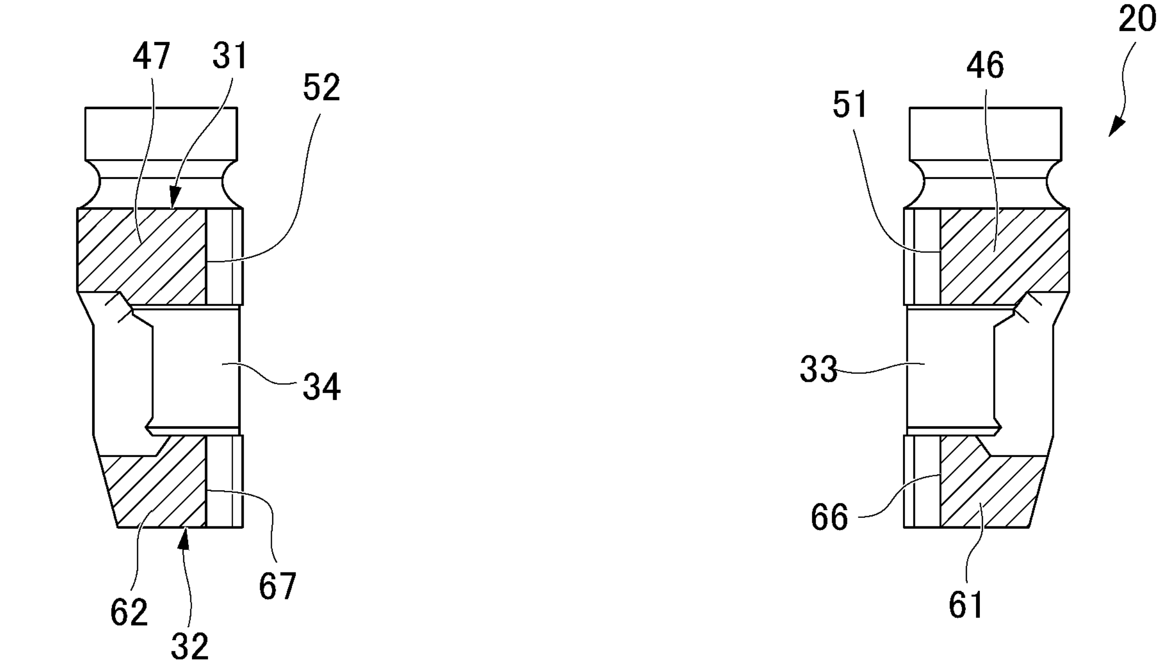
FIG. 4 is a cross-sectional view along line IV-IV of FIG. 3, illustrating the brake carrier of the disc brake of the first embodiment.

As illustrated in FIG. 4, the outer disposition part 32 includes a third connection part 61 extending from the first connection part 33, a fourth connection part 62 extending from the second connection part 34, and an outer beam part 63 illustrated in FIG. 3 connecting the third connection part 61 and the fourth connection part 62. The third connection part 61, the fourth connection part 62, and the outer beam part 63 are disposed on the outer side with respect to the disc 11. The outer disposition part 32 faces the surface 11*b* of the disc 11 on the outer side.

The third connection part 61 extends inward in the disc radial direction as illustrated in FIG. 2 from an end portion of the first connection part 33 on a side opposite to the first connection part 46 in the disc axial direction. The fourth connection part 62 extends inward in the disc radial direction from an end portion of the second connection part 34 on a side opposite to the second connection part 47 in the disc axial direction as illustrated in FIG. 1. The outer beam part 63 connects end portions on the disc radial direction inner side of the third connection part 61 illustrated in FIG. 2 and the fourth connection part 62 illustrated in FIG. 1. The outer beam part 63 extends in the disc circumferential direction.

As illustrated in FIG. 4, the third connection part 61 includes a third recessed part 66 formed to have a shape recessed outward in the disc circumferential direction from an inner surface thereof facing the disc circumferential direction inner side. The fourth connection part 62 includes a fourth recessed part 67 formed to have a shape recessed outward in the disc circumferential direction from an inner surface thereof facing the disc circumferential direction inner side. Therefore, the third recessed part 66 and the fourth recessed part 67 face each other in the disc circumferential direction, and form recessed shapes that are recessed in a direction away from each other in the disc circumferential direction. The third recessed part 66 penetrates the third connection part 61 in the disc axial direction. The fourth recessed part 67 penetrates the fourth connection part 62 in the disc axial direction.

The first recessed part 51 and the third recessed part 66 have the same shape and are aligned with each other in position in the disc radial direction and the disc circumferential direction. The second recessed part 52 and the fourth recessed part 67 have the same shape and are aligned with each other in position in the disc radial direction and the disc circumferential direction. The first recessed part 51 and the second recessed part 52 are mirror-symmetrical and aligned in position in the disc radial direction and the disc axial direction. The third recessed part 66 and the fourth recessed part 67 are mirror-symmetrical with respect to the radial direction reference plane, and are aligned with each other in position in the disc radial direction and the disc axial direction.

In the brake carrier 20, the inner disposition part 31 supports the first friction pad 26 illustrated in FIG. 2 with the first recessed part 51 of the first connection part 46 and the second recessed part 52 of the second connection part 47. Also, in the brake carrier 20, the outer disposition part 32 supports the second friction pad 27 illustrated in FIG. 2 with the third recessed part 66 of the third connection part 61 and the fourth recessed part 67 of the fourth connection part 62.

In the brake carrier 20, the first fixing part 42, the first connection part 46, the first connection part 33, and the third connection part 61 are disposed on the disc rotation exit side. In the brake carrier 20, the second fixing part 44, the second connection part 47, the second connection part 34, and the fourth connection part 62 are disposed on the disc rotation entry side.

The inner first friction pad 26 and the outer second friction pad 27 illustrated in FIG. 2 are parts having substantially the same shape. The first friction pad 26 and the second friction pad 27 each have a back plate 71 and a lining 72 that is attached to one surface side of the back plate 71 in a plate thickness direction.

The back plate 71 of the inner first friction pad 26 and the back plate 71 of the outer second friction pad 27 are common parts having the same shape. The back plate 71 includes a main body part 75 to which the lining 72 is adhered, a pair of protruding parts (not illustrated) that protrude in opposite directions to each other in the disc circumferential direction from both end portions of the main body part 75 in the disc circumferential direction.

The inner first friction pad 26 is disposed with the lining 72 made to face the surface 11*a* of the disc 11 on the inner side. In the first friction pad 26, the protruding part (not illustrated) of the back plate 71 on one side in the disc circumferential direction is fitted into the first recessed part 51 of the first connection part 46 via the first pad spring 24. The protruding part (not illustrated) of the back plate 71 on the other side in the disc circumferential direction is fitted into the second recessed part 52 of the second connection part 47 via the second pad spring 25. Thereby, the first friction pad 26 is supported by the brake carrier 20 to be movable in the disc axial direction in a state in which movement thereof in the disc circumferential direction and disc radial direction is restricted.

Also, the outer second friction pad 27 is disposed with the lining 72 made to face the surface 11*b* of the disc 11 on the outer side. In the second friction pad 27, the protruding part (not illustrated) of the back plate 71 on one side in the disc circumferential direction is fitted into the third recessed part 66 of the third connection part 61 via the first pad spring 24. In the second friction pad 27, the protruding part (not illustrated) of the back plate 71 on the other side in the disc circumferential direction is fitted into the fourth recessed part 67 of the fourth connection part 62 via the second pad spring 25. Thereby, the second friction pad 27 is supported by the brake carrier 20 to be movable in the disc axial direction in a state in which movement thereof in the disc circumferential direction and disc radial direction is restricted.

Here, the first pad spring 24 and the second pad spring 25 guide sliding of the first friction pad 26 and the second friction pad 27 in the disc axial direction. Further, the first pad spring 24 and the second pad spring 25 urge the first friction pad 26 and the second friction pad 27 outward in the disc radial direction.

As illustrated in FIG. 1, the brake caliper 21 includes a caliper main body part 101, a first slide pin 102, a second slide pin 103, a mounting bolt 104 for fixing the first slide pin 102 to the caliper main body part 101, and a mounting bolt 105 for fixing the second slide pin 103 to the caliper main body part 101. The first slide pin 102 and the second slide pin 103 are common parts having the same shape. The mounting bolt 104 and the mounting bolt 105 are also common parts having the same shape. Also, the brake caliper 21 includes a piston 111, a piston seal 112, and a piston boot 113 as illustrated in FIG. 2.

As illustrated in FIG. 1, the brake caliper 21 has a substantially mirror-symmetrical shape with respect to the radial direction reference plane. The radial direction reference line and the radial direction reference plane pass through a center position of the brake caliper 21 in the disc circumferential direction. The brake caliper 21 is fixed to the caliper main body part 101 with a pair of the first slide pin 102 and the second slide pin 103 aligned with each other in position in the axial direction and disposed in parallel. The first slide pin 102 of the brake caliper 21 is slidably fitted into the first pin insertion hole 55 formed in the first connection part 33 of the brake carrier 20 illustrated in FIG. 3. The second slide pin 103 is slidably fitted into the second pin insertion hole 56 formed in the second connection part 34 of the brake carrier 20. Thereby, the brake caliper 21 includes the pair of first slide pin 102 and second slide pin 103 disposed on both sides in the disc circumferential direction.

The caliper main body part 101 of the brake caliper 21 is supported by the brake carrier 20 via the first slide pin 102 and the second slide pin 103 to be slidable in the disc axial direction. In the brake carrier 20, the pair of first connection part 33 and second connection part 34 support the brake caliper 21 to be slidable in the disc axial direction. Specifically, in the brake caliper 21, the first slide pin 102 provided on one side in the disc circumferential direction is slidably fitted into the first pin insertion hole 55, illustrated in FIG. 3, of the first connection part 33 of the brake carrier 20. In the brake caliper 21, the second slide pin 103 provided on the other side in the disc circumferential direction is slidably fitted into the second pin insertion hole 56, illustrated in FIG. 3, of the second connection part 34 of the brake carrier 20. Thereby, the brake caliper 21 is provided on the brake carrier 20 to be movable in the disc axial direction. The first pin boot 22 covers a portion of the first slide pin 102 protruding from the brake carrier 20. The second pin boot 23 covers a portion of the second slide pin 103 protruding from the brake carrier 20.

The caliper main body part 101 is seamlessly and integrally formed by casting. The caliper main body part 101 also has a substantially mirror-symmetrical shape with respect to the radial direction reference plane. The radial direction reference line and the radial direction reference plane pass through a center position of the caliper main body part 101 in the disc circumferential direction. As illustrated in FIG. 2, the caliper main body part 101 includes a cylinder part 121 disposed on the inner side in the disc axial direction with respect to the disc 11, a bridge part 122 extending outward in the disc axial direction to straddle a circumference of the disc 11 from a portion of the cylinder part 121 on the disc radial direction outer side, and a pressing part 123 extending toward the disc radial direction inner side from a portion of the bridge part 122 on a side opposite to the cylinder part 121 and disposed on the outer side of the disc 11 in the disc axial direction. Also, as illustrated in FIG. 1, the caliper main body part 101 includes a first pin disposition part 124 provided on one end side of the cylinder part 121 in the disc circumferential direction, and a second pin disposition part 125 provided on the other end side of the cylinder part 121 in the disc circumferential direction. In the caliper main body part 101, the first pin disposition part 124 is disposed on the disc rotation exit side, and the second pin disposition part 125 is disposed on the disc rotation entry side.

Figure 5:
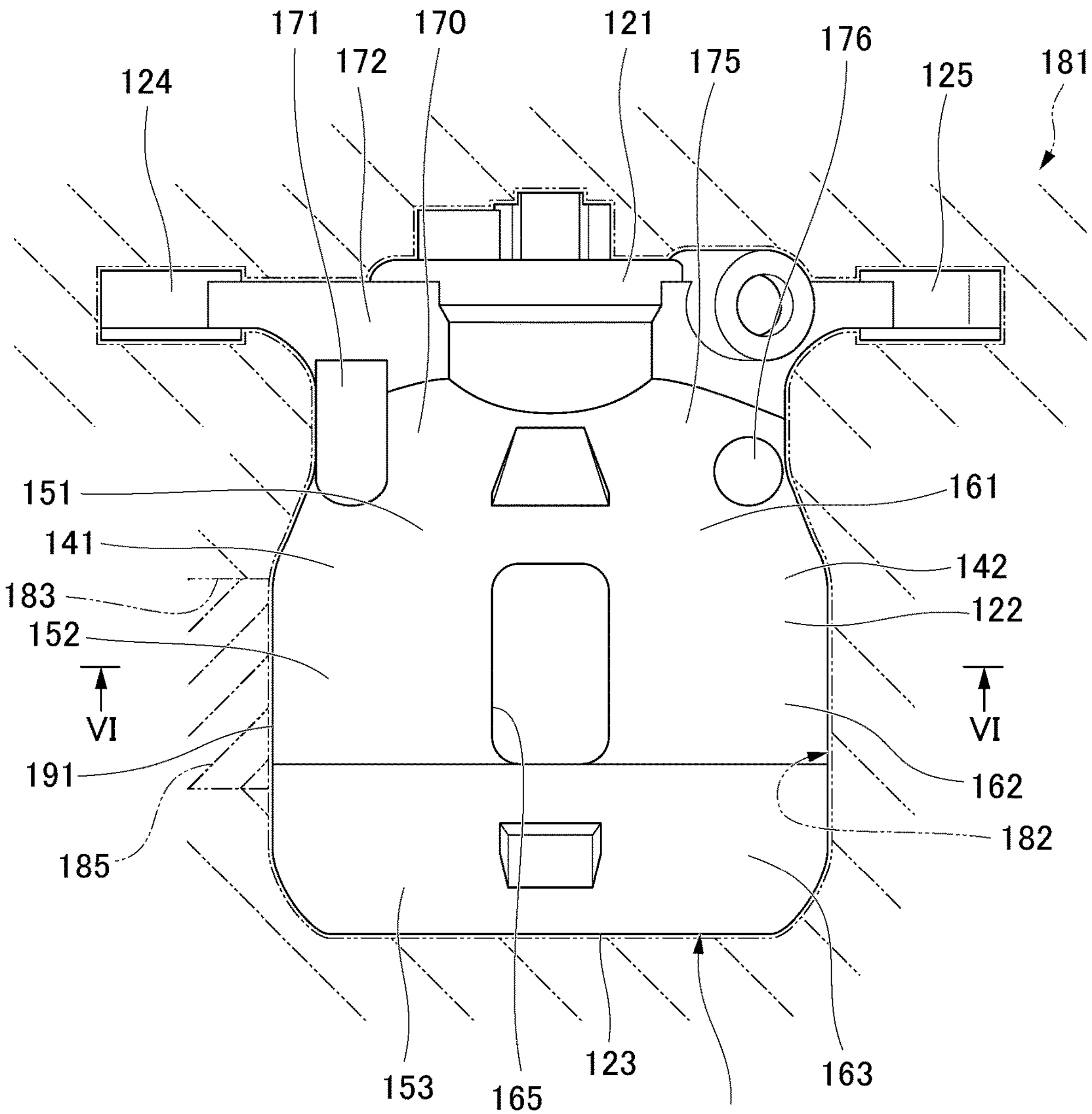
FIG. 5 is a plan view illustrating a caliper main body part of the disc brake of the first embodiment.
Figure 6:
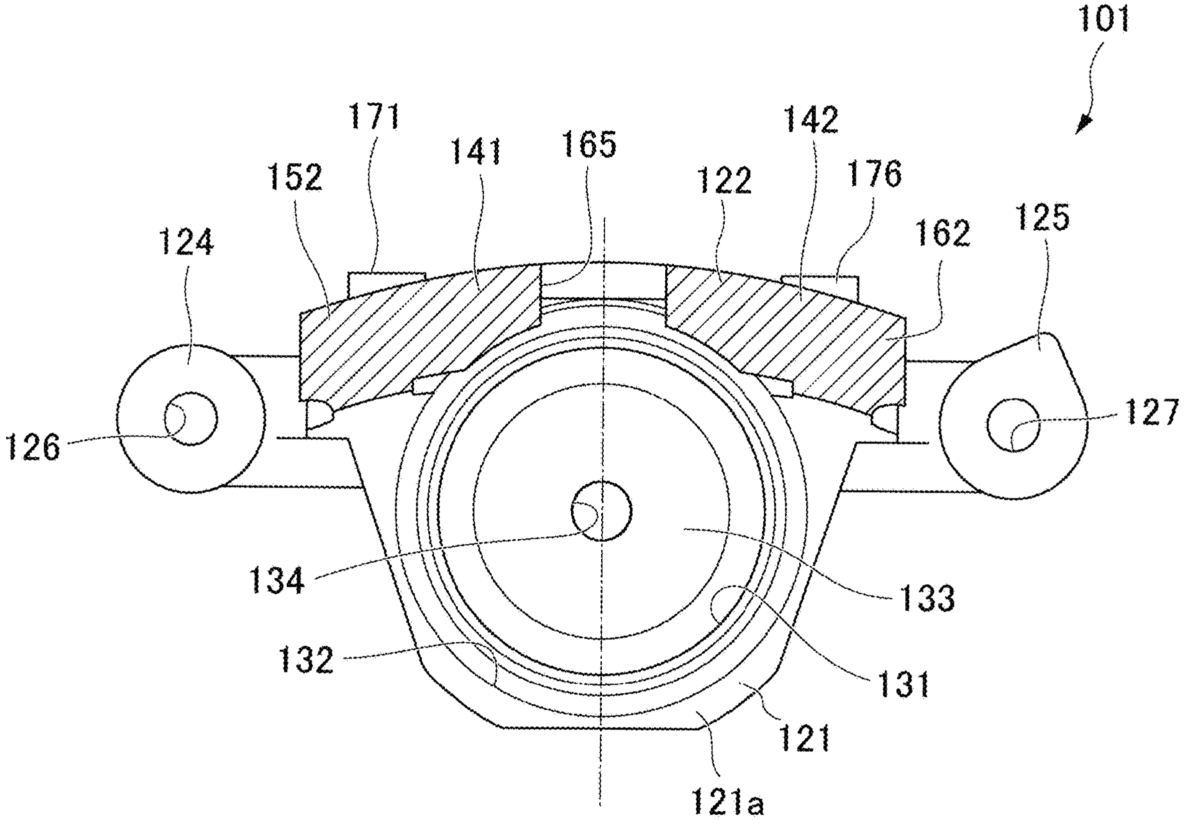
FIG. 6 is a cross-sectional view along line VI-VI of FIG. 5, illustrating the caliper main body part of the disc brake of the first embodiment.
Figure 7:
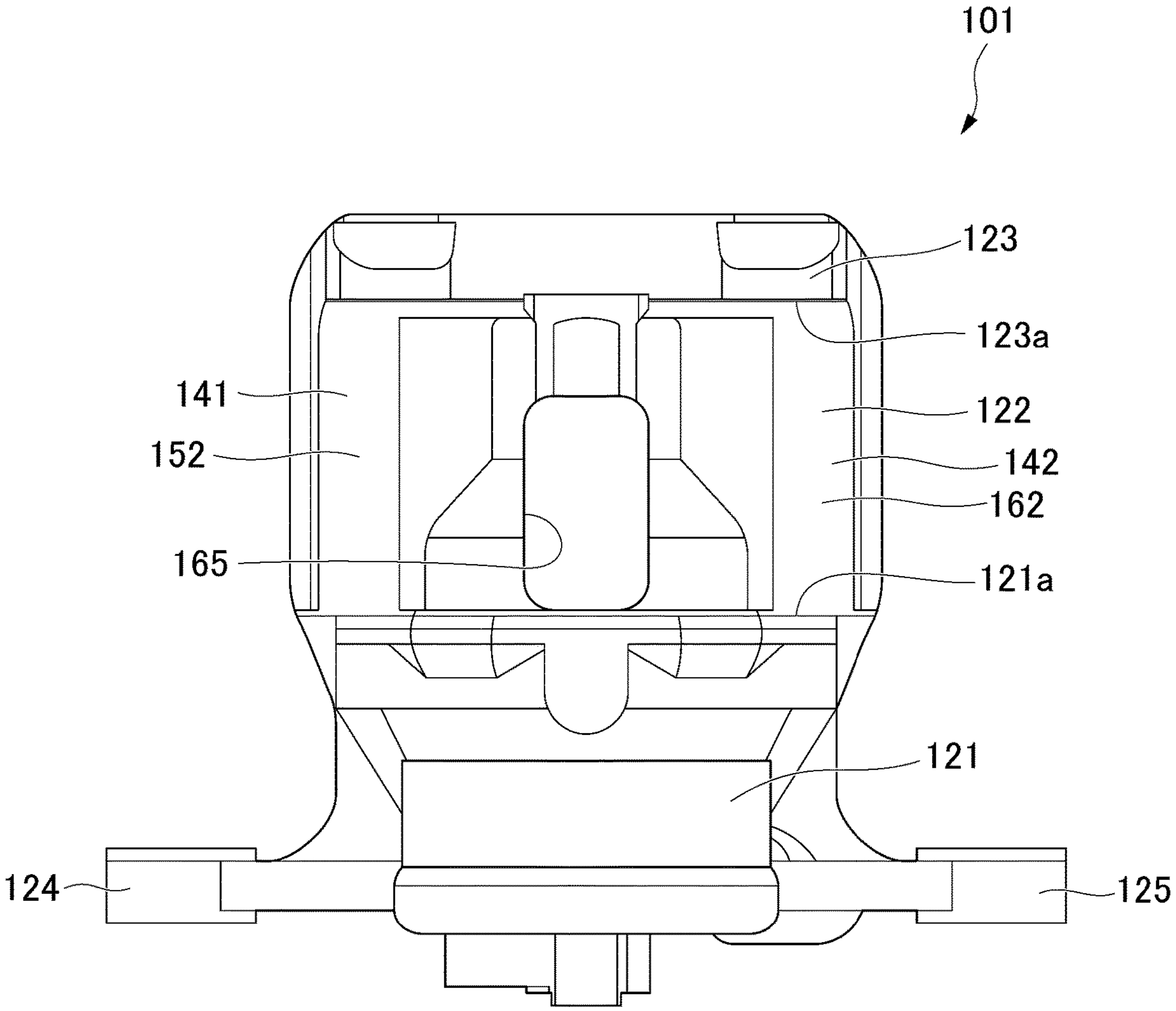
FIG. 7 is a bottom view illustrating the caliper main body part of the disc brake of the first embodiment.

The caliper main body part 101 has a shape illustrated in FIGS. 5 to 7. As illustrated in FIG. 6, a first pin mounting hole 126 penetrating in the disc axial direction is formed in the first pin disposition part 124 on the disc rotation exit side. A second pin mounting hole 127 penetrating in the disc axial direction is formed in the second pin disposition part 125 on the disc rotation entry side. A center of the first pin mounting hole 126 is a center of the first pin disposition part 124. A center of the second pin mounting hole 127 is a center of the second pin disposition part 125. The radial direction reference line is a straight line that bisects a line segment connecting the center of the first pin disposition part 124 and the center of the second pin disposition part 125. The radial direction reference plane is a plane bisecting a line segment connecting the center of the first pin disposition part 124 and the center of the second pin disposition part 125 and perpendicular to the line segment.

The first slide pin 102 illustrated in FIG. 1 is mounted in the first pin disposition part 124 on one side in the disc circumferential direction of the caliper main body part 101. The first slide pin 102 is mounted with the mounting bolt 104 that is inserted through the first pin mounting hole 126. Also, the second slide pin 103 is mounted in the second pin disposition part 125 on the other side in the disc circumferential direction of the caliper main body part 101. The second slide pin 103 is mounted with the mounting bolt 105 that is inserted through the second pin mounting hole 127. Therefore, the first slide pin 102 is provided in the first pin disposition part 124 to extend in the disc axial direction. The second slide pin 103 is provided in the second pin disposition part 125 to extend in the disc axial direction.

When the first slide pin 102 is inserted into the first pin insertion hole 55 of the first connection part 33 of the brake carrier 20, the first pin disposition part 124 of the brake caliper 21 overlaps the first connection part 33 of the brake carrier 20 in position in the disc radial direction and the disc circumferential direction. Also, when the second slide pin 103 is inserted into the second pin insertion hole 56 of the second connection part 34 of the brake carrier 20, the second pin disposition part 125 of the brake caliper 21 overlaps the second connection part 34 of the brake carrier 20 in position in the disc radial direction and the disc circumferential direction.

In this state, the first connection part 46 of the brake carrier 20 extends from the first fixing part 42 in a direction toward the first pin disposition part 124 of the brake caliper 21 in a plane perpendicular to the disc axial direction. Also, the second connection part 47 of the brake carrier 20 extends from the second fixing part 44 in a direction toward the second pin disposition part 125 of the brake caliper 21 in the plane perpendicular to the disc axial direction. The first connection part 46 is positioned in a first section on an outer side of the inner beam part 45 and on an inner side of the first connection part 33 and the first pin disposition part 124 in the disc radial direction. The second connection part 47 is positioned in a second section on an outer side of the inner beam part 45 and on an inner side of the second connection part 34 and the second pin disposition part 125 in the disc radial direction.

As illustrated in FIG. 2, the cylinder part 121 of the caliper main body part 101 has a cylinder hole 131 in which the piston 111 is accommodated. The cylinder hole 131 is formed inside a barrel part 130 of the cylinder part 121 in the disc axial direction. Therefore, the piston 111 is accommodated in the cylinder hole 131 of the cylinder part 121 to be movable in the disc axial direction.

One end side of the cylinder hole 131 in the disc axial direction is open to form an opening end portion 132, and the other end side in the disc axial direction is closed by a bottom portion 133 of the cylinder part 121. The opening end portion 132 of the cylinder hole 131 is disposed on an end surface 121*a* of an end portion of the cylinder part 121 on the pressing part 123 side in the disc axial direction. The end surface 121*a* faces an end surface 123*a* of an end portion of the pressing part 123 on the cylinder part 121 side in the disc axial direction. A connection hole 134 communicating with the inside of the cylinder hole 131 is formed to penetrate through the bottom portion 133 of the cylinder part 121 in the disc axial direction. A brake pipe (not illustrated) is connected to the connection hole 134.

In the barrel part 130 of the cylinder part 121, an annular boot fitting groove 136 that is recessed radially outward from an inner circumferential surface of the barrel part 130 is formed at a position on the bottom portion 133 side in the disc axial direction with respect to the opening end portion 132 of the cylinder hole 131. Also, in the barrel part 130, an annular seal receiving groove 137 that is recessed radially outward from the inner circumferential surface of the barrel part 130 is formed at a position on the bottom portion 133 side in the disc axial direction with respect to the boot fitting groove 136 of the cylinder hole 131. The piston seal 112 has an annular shape and is fitted in the seal receiving groove 137. The piston seal 112 seals a gap between the barrel part 130 and the piston 111. The piston boot 113 has a bellows cylindrical shape, and has one end side fitted in the boot fitting groove 136 and the other end side fitted on an outer circumferential portion of the piston 111. The piston boot 113 covers a portion of the piston 111 protruding from the cylinder part 121.

In the brake caliper 21, the piston 111 is disposed on a side opposite to the disc 11 with respect to the inner first friction pad 26. The piston 111 moves in the disc axial direction to press the first friction pad 26. In other words, the brake caliper 21 accommodates the piston 111 that presses the first friction pad 26 in the disc axial direction. In the brake caliper 21, the pressing part 123 is disposed on a side opposite to the disc 11 with respect to the outer second friction pad 27 and presses the second friction pad 27.

As illustrated in FIGS. 5 to 7, the bridge part 122 is divided into two regions including a first bridge part 141 on the first pin disposition part 124 side with respect to the radial direction reference plane in the disc circumferential direction and a second bridge part 142 on the second pin disposition part 125 side with respect to the radial direction reference plane in the disc circumferential direction with the radial direction reference plane as a boundary. Both the first bridge part 141 and the second bridge part 142 are provided across the outer circumferential side of the disc 11. In the bridge part 122, the first bridge part 141 is disposed on the disc rotation exit side, and the second bridge part 142 is disposed on the disc rotation entry side.

The first bridge part 141 is divided into three regions including a first section part 151, a second section part 152, and a third section part 153 in the disc axial direction. The first section part 151 is a region that overlaps the cylinder part 121 in position in the disc axial direction. The second section part 152 is a region positioned between the opening end portion 132 of the cylinder hole 131 of the cylinder part 121 and the pressing part 123 in the disc axial direction. The third section part 153 is a region that overlaps the pressing part 123 in the disc axial direction. Specifically, the second section part 152 is a section between the end surface 121*a* of the cylinder part 121 on the pressing part 123 side and the end surface 123*a* of the pressing part 123 on the cylinder part 121 side in the first bridge part 141.

Further, the second bridge part 142 is also divided into three regions including a first section part 161, a second section part 162, and a third section part 163 in the disc axial direction. The first section part 161 is a region that overlaps the cylinder part 121 in position in the disc axial direction. The second section part 162 is a region positioned between the opening end portion 132 of the cylinder hole 131 and the pressing part 123 in the disc axial direction. The third section part 163 is a region that overlaps the pressing part 123 in position in the disc axial direction. Specifically, the second section part 162 is a section between the end surface 121*a* of the cylinder part 121 and the end surface 123*a* of the pressing part 123 in the second bridge part 142.

In the bridge part 122, a through hole 165 penetrating the bridge part 122 in the disc axial direction is formed at a position across the second section part 152 and the second section part 162.

A rib 171 protruding outward in the disc radial direction from a first section main body part 170 of the first section part 151 is formed on the first section part 151 of the first bridge part 141. A portion of the first section part 151 excluding the rib 171 is the first section main body part 170. The rib 171 extends in the disc axial direction and continuously straddles the first bridge part 141 and the cylinder part 121 in the disc axial direction. The rib 171 protrudes outward in the disc radial direction from a cylinder main body part 172 excluding the rib 171 of the cylinder part 121. In other words, a part of the rib 171 is provided on the first bridge part 141 and a remaining part thereof is provided on the cylinder part 121. The rib 171 protrudes from the first section main body part 170 of the first bridge part 141 and the cylinder main body part 172 of the cylinder part 121 in a direction away from the first friction pad 26 in a plane perpendicular to the disc axial direction.

A columnar protrusion 176 protruding outward in the disc radial direction from a first section main body part 175 of the first section part 161 is formed in the first section part 161 of the second bridge part 142. A portion of the first section part 161 excluding the protrusion 176 is the first section main body part 175. The protrusion 176 protrudes from the first section main body part 175 of the first section part 161 in a direction away from the first friction pad 26 in the plane perpendicular to the disc axial direction.

The rib 171 and the protrusion 176 are aligned with each other in position of the end portions on the pressing part 123 side in the disc axial direction, aligned with each other in position in the disc radial direction, and disposed to be spaced apart from each other in the disc circumferential direction. The rib 171 and the protrusion 176 have the same width in the disc circumferential direction and the same protrusion height in the disc radial direction. The rib 171 is longer than the protrusion 176 in the disc axial direction. Therefore, the rib 171 has a larger volume than the protrusion 176. When the caliper main body part 101 is machined, it is placed on a jig of a machining apparatus with the rib 171 and the protrusion 176 brought into contact with the jig.

A mold 181 used when the caliper main body part 101 is cast includes a cavity 182 for forming the caliper main body part 101 and a sprue 183 for pouring a molten metal into the cavity 182. The sprue 183 is disposed to face an end portion of the second section part 152 of the first bridge part 141 on the disc circumferential direction outer side. In other words, the sprue 183 is disposed to face an end portion of the second section part 152 of the first bridge part 141 on a side opposite to the second bridge part 142 in the disc circumferential direction. Therefore, in the caliper main body part 101 immediately after casting, a sprue remaining portion 185 formed by solidification of the molten metal that has been in the sprue 183 remains at the end portion of the second section part 152 of the first bridge part 141 on the disc circumferential direction outer side. The sprue remaining portion 185 is scraped off by machining after the casting. Therefore, the caliper main body part 101, in a state of a finished product, has a sprue mark 191, which is a cut surface remaining after the sprue remaining portion 185 is removed, at the end portion of the second section part 152 of the first bridge part 141 on the disc circumferential direction outer side. The caliper main body part 101 has a casting surface around the sprue mark 191. The sprue mark 191 is a mark of the sprue 183 formed at the time of casting the caliper main body part 101. In other words, the sprue mark 191 formed at the time of casting the caliper main body part 101 is provided on the first bridge part 141.

When the caliper main body part 101 is divided by a straight line that bisects a line segment connecting a center of the first pin disposition part 124 and a center of the second pin disposition part 125 when the caliper main body part 101 is viewed from the disc axial direction, the brake caliper 21 has a shape in which a moment of inertia of area of the caliper main body part 101 on the first bridge part 141 side in which the sprue mark 191 is provided is larger than a moment of inertia of area of the caliper main body part 101 on the second bridge part 142 side due to the provision of the rib 171.

The caliper main body part 101 has a shape in which the moment of inertia of area of the first bridge part 141 is larger than the moment of inertia of area of the second bridge part 142 due to the provision of the rib 171.

The caliper main body part 101 is cast by steps including a step of preparing the mold 181 for the caliper main body part 101 having a shape in which the moment of inertia of area of the caliper main body part 101 on the first bridge part 141 side in which the sprue mark 191 is provided is larger than the moment of inertia of area of the caliper main body part 101 on the second bridge part 142 side due to the provision of the rib 171 when the caliper main body part 101 is divided by a straight line that bisects a line segment connecting the center of the first pin disposition part 124 and the center of the second pin disposition part 125 when the caliper main body part 101 is viewed from the disc axial direction, and a second step of pouring the molten metal into the mold 181 from the first bridge part 141 side.

The caliper main body part 101 is cast by steps including the step of preparing the mold 181 for the caliper main body part 101 having a shape in which the moment of inertia of area of the first bridge part 141 is larger than the moment of inertia of area of the second bridge part 142 due to the provision of the rib 171, and the second step of pouring the molten metal into the mold 181 from the first bridge part 141 side.

Here, a direction of the above-described moment of inertia of area of the first bridge part 141 and the second bridge part 142 is a direction in which the caliper main body part 101 elastically deforms in the disc axial direction. The rib 171 extends in this disc axial direction.

In the disc brake 10, a brake fluid is introduced into the cylinder hole 131 of the cylinder part 121 of the brake caliper 21 via the brake pipe (not illustrated). Then, a brake hydraulic pressure acts on the piston 111 in the cylinder part 121. As a result, the piston 111 moves forward to the disc 11 side and presses the inner first friction pad 26 disposed between the piston 111 and the disc 11 toward the disc 11. Then, the inner first friction pad 26 is guided by the brake carrier 20 via the first pad spring 24 and the second pad spring 25 to move in the disc axial direction and comes into contact with one surface 11*a* of the disc 11 on the lining 72.

Also, due to a reaction force of this pressing, the caliper main body part 101 slides the first slide pin 102 and the second slide pin 103 with respect to the brake carrier and moves them in the disc axial direction. As a result, the pressing part 123 presses the outer second friction pad 27 disposed between the pressing part 123 and the disc 11 toward the disc 11. Then, the outer second friction pad 27 is guided by the brake carrier 20 via the first pad spring 24 and the second pad spring 25 to move in the disc axial direction and comes into contact with the other surface 11*b* of the disc 11 on the lining 72.

In this way, the brake caliper 21 slidably supported by the brake carrier 20 sandwiches the pair of first friction pad 26 and second friction pad 27 with the piston 111 and the pressing part 123 from both sides in the disc axial direction due to an operation of the piston 111 to press the first friction pad 26 and the second friction pad 27 against the surfaces 11*a* and 11*b* on both sides of the disc 11. As a result, the brake caliper 21 applies frictional resistance to the disc 11 to generate a braking force. In other words, the pair of first friction pad 26 and second friction pad 27 movably provided in the brake carrier 20 are pressed against the surfaces 11*a* and 11*b* on both sides of the disc 11 by the brake caliper 21. At this time, when the vehicle travels forward, the first connection part 46 and the third connection part 61 of the brake carrier 20 on the disc rotation exit side mainly receive a braking torque from the first friction pad 26 and the second friction pad 27. When the vehicle travels rearward, the second connection part 47 and the fourth connection part 62 of the brake carrier 20 mainly receive a braking torque from the first friction pad 26 and the second friction pad 27. The brake caliper 21 is a so-called first type (slide type) caliper.

The above-described Patent Document 1 discloses the following points as a method for casting a cast part.

The method for casting a cast part includes selecting an insert for integral casting with a cast part. Here, the insert is made of a material capable of changing NVH characteristics of the cast part, and has characteristics of being able to be penetrated by a molten metal during casting and of being able to change the NVH characteristics of the cast part due to a change in composition of the insert material. Then, the method for casting a cast part includes determining a material composition required to achieve desired NVH characteristics, and further includes determining an appropriate position into which the insert should be inserted within the cast part and casting the insert into the part at that position. However, in adjusting a rigidity of a predetermined portion by casting the insert material as described above, there is a likelihood that the costs will increase due to positioning of the insert material and material costs.

Here, at the time of casting using the mold 181 for the caliper main body part 101, the second bridge part 142 of the caliper main body part 101 on a side the opposite to the sprue 183 dissipates heat to the poured mold 181 for the high-temperature molten cast iron faster than the first bridge part 141 in the vicinity of the sprue 183, and as a result, the molten cast iron thereof has a high cooling rate and is likely to form pearlite. The second bridge part 142 with a strong pearlite-forming tendency has a cast iron composition that is hard and less ductile. On the other hand, the first bridge part 141 on the sprue 183 side has a lower cooling rate because of an intermittent inflow of the high-temperature molten cast iron, making it relatively easier for graphite to grow compared to the second bridge part 142 on a side opposite to the sprue 183. Thereby, the cast iron of the first bridge part 141 on the sprue 183 side has a composition with high ductility. If the caliper main body part has a symmetrical shape with respect to the radial direction reference plane, such unevenness of rigidity occurs in the caliper main body part. Then, there is a likelihood that unevenness will occur in a pressing force on the first friction pad 26 and the second friction pad 27 and uneven wear will occur in the first friction pad 26 and the second friction pad 27.

Therefore, it is also conceivable to adjust a rigidity of a predetermined portion by casting an insert material as disclosed in Patent Document 1. However, there is a likelihood that casting an insert material will cause an increase in costs of the mold due to positioning of the insert material and an increase in costs due to material costs of the insert material itself.

In the brake caliper 21 and the disc brake 10 including the same according to the first embodiment, when the caliper main body part 101 is divided by a straight line that bisects a line segment connecting the center of the first pin disposition part 124 and the center of the second pin disposition part 125 when viewed from the disc axial direction, the brake caliper 21 and the disc brake 10 have a shape in which the moment of inertia of area of the caliper main body part 101 on the first bridge part 141 side in which the sprue mark 191 is provided is larger than the moment of inertia of area of the caliper main body part 101 on the second bridge part 142 side due to the formation of the rib 171. That is, a difference is provided in a finished shape of the caliper main body part 101 so that the moment of inertia of area of the caliper main body part 101 on the first bridge part 141 side which is in the vicinity of the sprue mark 191 is larger than the moment of inertia of area of the caliper main body part 101 on the second bridge part 142 side which is on the symmetrical side of the first bridge part 141. Thereby, unevenness of the rigidity within the caliper main body part 101 due to a difference in ductility caused by the difference in cooling rate of the molten cast iron for casting the caliper main body part 101 can be canceled out by the shape without casting an insert material, and thus the unevenness of the rigidity can be curbed. Therefore, it is possible to curb unevenness of the rigidity while curving an increase in costs of the brake caliper 21 and the disc brake 10 including the same.

A method for casting the brake caliper 21 of the first embodiment is a method for casting the caliper main body part 101, and includes a first step of preparing the mold 181 for the caliper main body part 101 for forming the caliper main body part 101 into the above-described shape, and a second step of pouring the molten metal into the mold 181 from the first bridge part 141 side to cast the caliper main body part 101 of the brake caliper 21. Thereby, since the caliper main body part 101 has the above-described shape, unevenness of the rigidity within the caliper main body part 101 due to a difference in ductility caused by the difference in cooling rate of the molten cast iron for casting the caliper main body part 101 can be canceled out by the shape without casting an insert material, and thus the unevenness of the rigidity can be curbed. Therefore, it is possible to curb unevenness of the rigidity while curving an increase in costs of the brake caliper 21 and the disc brake 10 including the same.

Also, in the disc brake 10 of the first embodiment, a direction of the above-described moment of inertia of area of the first bridge part 141 and the second bridge part 142 in the caliper main body part 101 is a direction in which the caliper main body part 101 elastically deforms in the disc axial direction. Here, the first bridge part 141 of the caliper main body part 101 on the sprue mark 191 side has a strong tendency to open in the disc axial direction. Therefore, when the moment of inertia of area of the first bridge part 141 in the disc axial direction is made larger than the moment of inertia of area of the second bridge part 142 in the disc axial direction, unevenness of the rigidity can be more effectively curbed.

Also, the first bridge part 141 has the rib 171 that protrudes in a direction away from the first friction pad 26 in a plane perpendicular to the disc axial direction so that the moment of inertia of area thereof is made different from that of the second bridge part 142. Therefore, a rigidity of the caliper main body part 101 can be easily adjusted by the rib 171.

When unevenness of the rigidity of the brake caliper 21 and the caliper main body part 101 is curbed as described above, unevenness of the pressing force on the first friction pad 26 and the second friction pad 27 can be curbed. Therefore, uneven wear of the first friction pad 26 and the second friction pad 27 can be curbed, and deterioration in performance such as squeal noise, judder, and deterioration in drag torque due to the uneven wear can be curbed. This is specific effects obtained by applying the above-described configuration to the brake caliper 21. The effects are particularly high in the small brake caliper 21 that is mounted on a small vehicle having a narrow disposition layout in the vehicle.

Second Embodiment

Next, a second embodiment will be described mainly on the basis of FIGS. 8 and 9, focusing on differences from the first embodiment. Further, parts common to those in the first embodiment will be denoted by the same terms and the same reference signs.

Figure 8:
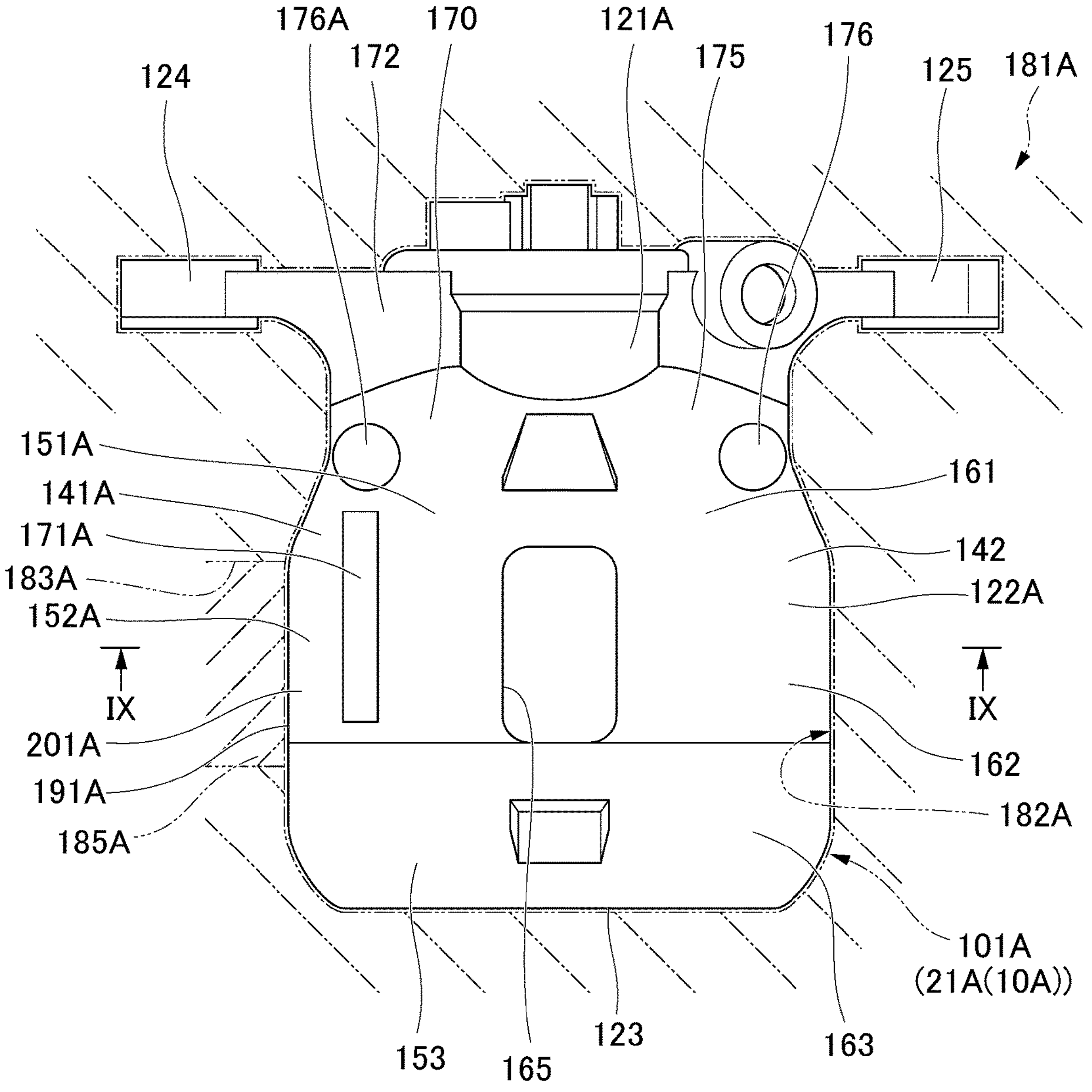
FIG. 8 is a plan view illustrating a caliper main body part of a disc brake of a second embodiment.
Figure 9:
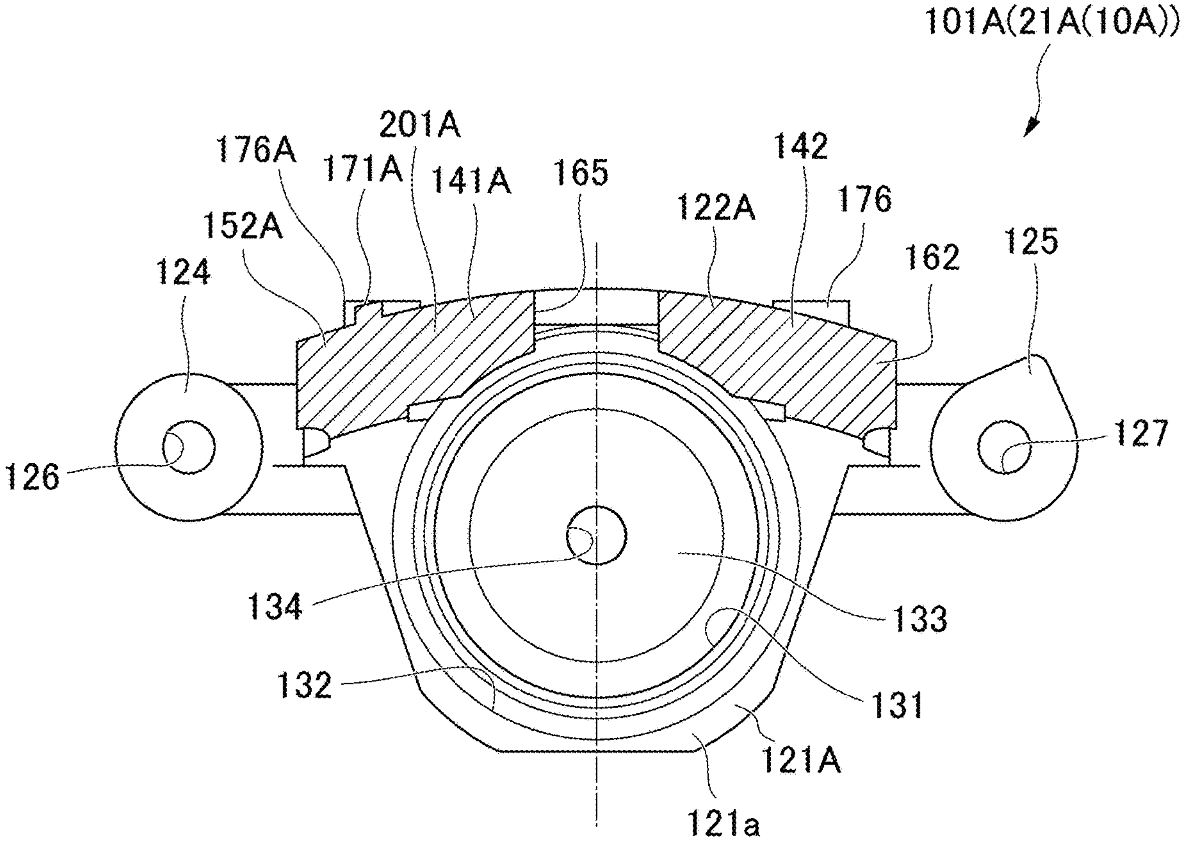
FIG. 9 is a cross-sectional view along line IX-IX of FIG. 8, illustrating the caliper main body part of the disc brake of the second embodiment.

In the second embodiment, as illustrated in FIGS. 8 and 9, a caliper main body part 101A that is partially different from the caliper main body part 101 is used. Therefore, a brake caliper 21A of the second embodiment includes the caliper main body part 101A that is partially different from the caliper main body part 101. A disc brake 10A of the second embodiment includes the brake caliper 21A that is partially different from the brake caliper 21.

The caliper main body part 101A is also seamlessly and integrally formed by casting and has a substantially mirror-symmetrical shape with a radial direction reference line and a radial direction reference plane passing through a center position in a disc circumferential direction. The caliper main body part 101A includes a cylinder part 121A partly different from the cylinder part 121 and a bridge part 122A partly different from the bridge part 122.

The rib 171 is not provided on the cylinder part 121A and the bridge part 122A. The cylinder part 121A differs from the cylinder part 121 in that the rib 171 is not provided. The bridge part 122A includes a first bridge part 141A that is partially different from the first bridge part 141, and the first bridge part 141A includes a first section part 151A that is partially different from the first section part 151, and a second section part 152A that is partially different from the second section part 152. The second section part 152A is also a section between an opening end portion 132 and a pressing part 123 in the first bridge part 141A, and a section between an end surface 121*a* and an end surface 123*a* in the first bridge part 141A. The first bridge part 141A has a protrusion 176A instead of the rib 171 on the first section part 151A. The first bridge part 141A and a second bridge part 142 are formed with the radial direction reference plane as a boundary.

The protrusion 176A has a columnar shape and protrudes outward in a disc radial direction from a first section main body part 170 of the first bridge part 141A. In other words, the protrusion 176A protrudes from the first section main body part 170 of the first section part 151A in a direction away from a first friction pad 26 in a plane perpendicular to a disc axial direction.

The protrusion 176A and a protrusion 176 are aligned with each other in position in the disc axial direction, aligned with each other in position in the disc radial direction, and disposed to be spaced apart from each other in the disc circumferential direction. The protrusion 176A and the protrusion 176 have a mirror-symmetrical shape and have a columnar shape with the same diameter and height. When the caliper main body part 101A is machined, it is placed on a jig of a machining apparatus with the protrusion 176A and the protrusion 176 brought into contact with the jig.

A rib 171A protruding outward in the disc radial direction from the first section main body part 170 of the first section part 151A and a second section main body part 201A of the second section part 152A is formed in the first section part 151A and the second section part 152A of the first bridge part 141A. A portion of the first section part 151A excluding the protrusion 176A and the rib 171A is the first section main body part 170, and a portion of the second section part 152A excluding the rib 171A is the second section main body part 201A. The rib 171A extends in the disc axial direction, and continuously straddles the first section part 151A and the second section part 152A in the disc axial direction. In other words, a portion of the rib 171A is provided in the first section part 151A and the remaining portion thereof is provided in the second section part 152A. The rib 171A protrudes from the first section main body part 170 and the second section main body part 201A of the first bridge part 141A in a direction away from the first friction pad 26 in a plane perpendicular to the disc axial direction.

A mold 181A used when the caliper main body part 101A is cast includes a cavity 182A for forming the caliper main body part 101A and a sprue 183A for pouring a molten metal into the cavity 182A. The sprue 183A is disposed to face an end portion of the second section part 152A of the first bridge part 141A on a disc circumferential direction outer side. Therefore, in the caliper main body part 101A immediately after casting, a sprue remaining portion 185A formed by solidification of the molten metal that has been in the sprue 183A remains at the end portion of the second section part 152A of the first bridge part 141A on the disc circumferential direction outer side.

Therefore, the caliper main body part 101A, in a state of a finished product, has a sprue mark 191A, which is a cut surface remaining after the sprue remaining portion 185A is removed, at the end portion of the second section part 152A of the first bridge part 141A on the disc circumferential direction outer side. The caliper main body part 101A has a casting surface around the sprue mark 191A. The sprue mark 191A is a mark of the sprue 183A formed at the time of casting the caliper main body part 101A. In other words, the sprue mark 191A formed at the time of casting the caliper main body part 101A is provided on the first bridge part 141A.

When the caliper main body part 101A is divided by a straight line that bisects a line segment connecting a center of a first pin disposition part 124 and a center of a second pin disposition part 125 when the caliper main body part 101A is viewed from the disc axial direction, the brake caliper 21A has a shape in which a moment of inertia of area of the caliper main body part 101A on the first bridge part 141A side in which the sprue mark 191A is provided is larger than a moment of inertia of area of the caliper main body part 101A on the second bridge part 142 side due to the provision of the rib 171A.

The caliper main body part 101A has a shape in which a moment of inertia of area of the first bridge part 141A is larger than a moment of inertia of area of the second bridge part 142 due to the provision of the rib 171A.

The caliper main body part 101A has a shape in which a moment of inertia of area of the second section part 152A of the first bridge part 141A is larger than a moment of inertia of area of a second section part 162 of the second bridge part 142 due to the provision of the rib 171A.

The caliper main body part 101A is cast by steps including a step of preparing the mold 181A for the caliper main body part 101A having a shape in which the moment of inertia of area of the caliper main body part 101A on the first bridge part 141A side in which the sprue mark 191A is provided is larger than the moment of inertia of area of the caliper main body part 101A on the second bridge part 142 side due to the provision of the rib 171A when the caliper main body part 101A is divided by a straight line that bisects a line segment connecting the center of the first pin disposition part 124 and the center of the second pin disposition part 125 when the caliper main body part 101A is viewed from the disc axial direction, and a second step of pouring the molten metal into the mold 181A from the first bridge part 141A side.

The caliper main body part 101A is cast by steps including the step of preparing the mold 181A for the caliper main body part 101A having a shape in which the moment of inertia of area of the first bridge part 141A is larger than the moment of inertia of area of the second bridge part 142 due to the provision of the rib 171A, and the second step of pouring the molten metal into the mold 181A from the first bridge part 141A side.

The caliper main body part 101A is cast by steps including the step of preparing the mold 181A for the caliper main body part 101A having a shape in which the moment of inertia of area of the second section part 152A of the first bridge part 141A is larger than the moment of inertia of area of the second section part 162 of the second bridge part 142 due to the provision of the rib 171A, and the second step of pouring the molten metal into the mold 181A from the first bridge part 141A side.

Here, a direction of the above-described moment of inertia of area of the first bridge part 141A and the second bridge part 142 is a direction in which the caliper main body part 101A elastically deforms in the disc axial direction. The rib 171A extends in this disc axial direction.

Also, the above-described moment of inertia of area of the first bridge part 141A is obtained from a cross section of the second section part 152A which is a section between the opening end portion 132 of a cylinder hole 131 facing the first friction pad 26 and the pressing part 123 of a second friction pad 27 in the disc axial direction. The above-described moment of inertia of area of the second bridge part 142 is obtained from a cross section of the second section part 162 which is a section between the opening end portion 132 and the pressing part 123 in the disc axial direction.

When the caliper main body part 101A is divided by a straight line that bisects a line segment connecting the center of the first pin disposition part 124 and the center of the second pin disposition part 125 when viewed from the disc axial direction, the brake caliper 21A has a shape in which a cross-sectional area of the caliper main body part 101A on the first bridge part 141A side in which the sprue mark 191A is provided is larger than a cross-sectional area of the caliper main body part 101A on the second bridge part 142 side due to the provision of the rib 171A.

The caliper main body part 101A has a shape in which a cross-sectional area of a cross section of the second section part 152A of the first bridge part 141A in a plane passing through the rib 171A and perpendicular to the disc axis is larger than a cross-sectional area of a cross section of the second section part 162 of the second bridge part 142 in the same plane due to the provision of the rib 171A.

In the brake caliper 21A and the disc brake 10A including the same according to the second embodiment, the above-described moment of inertia of area of the first bridge part 141A of the caliper main body part 101A is larger than the above-described moment of inertia of area of the second bridge part 142 in a plane perpendicular to the disc axial direction due to the provision of the rib 171A protruding in a direction away from the first friction pad 26. Therefore, a rigidity of the caliper main body part 101A can be easily adjusted by the rib 171A.

Also, the above-described moment of inertia of area of the first bridge part 141A of the caliper main body part 101A is obtained from a cross section of the second section part 152A which is a section between the opening end portion 132 of the cylinder hole 131 facing the first friction pad 26 and the pressing part 123 of the second friction pad 27 in the disc axial direction. Also, the above-described moment of inertia of area of the second bridge part 142 is obtained from a cross section of the second section part 162 which is a section between the opening end portion 132 and the pressing part 123 in the disc axial direction. Therefore, the rigidity of the caliper main body part 101A can be effectively adjusted.

Third Embodiment

Next, a third embodiment will be described mainly on the basis of FIGS. 10 to 12, focusing on differences from the second embodiment. Further, parts common to those in the second embodiment will be denoted by the same terms and the same reference signs.

Figure 10:
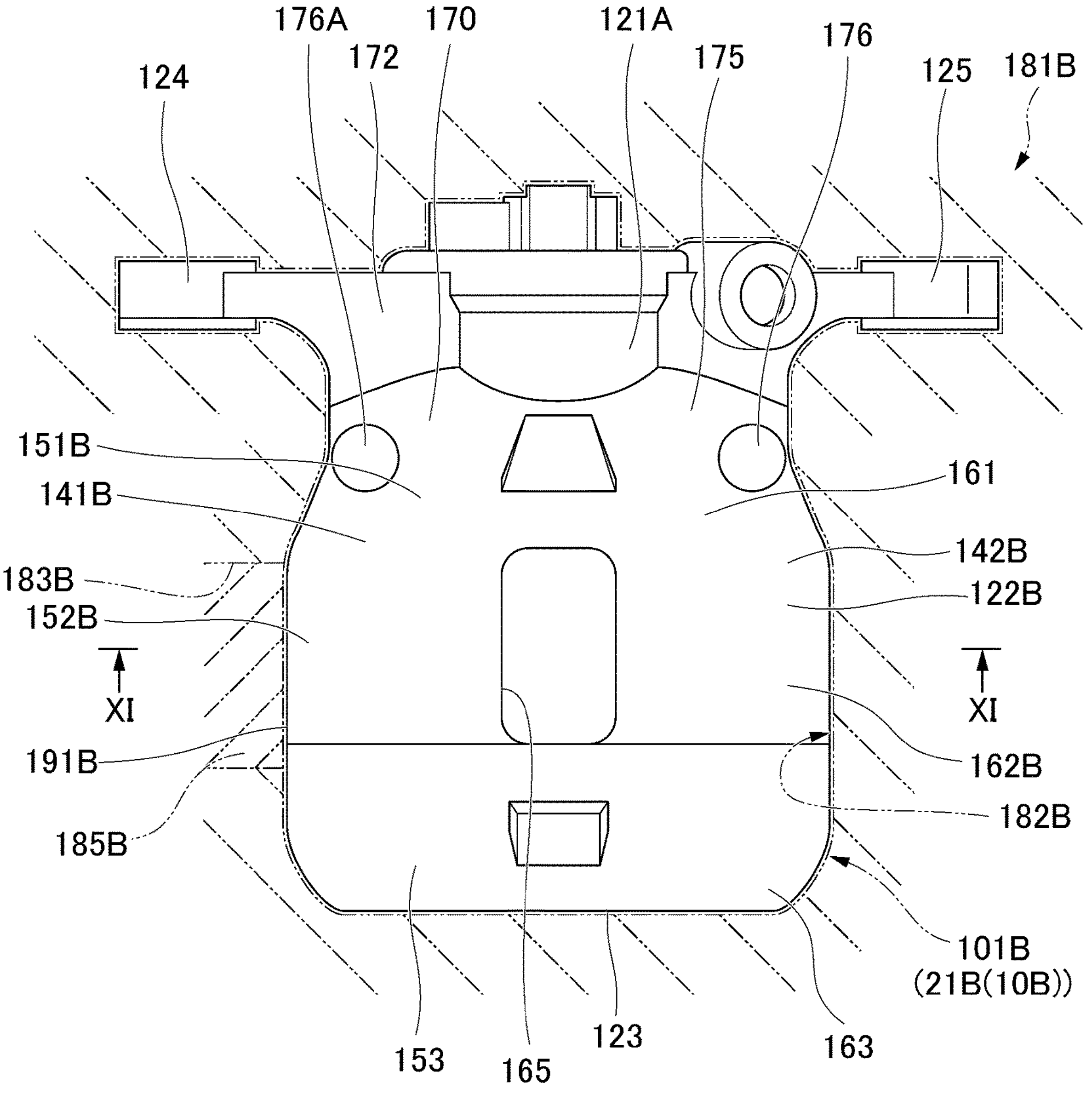
FIG. 10 is a plan view illustrating a caliper main body part of a disc brake of a third embodiment.
Figure 11:
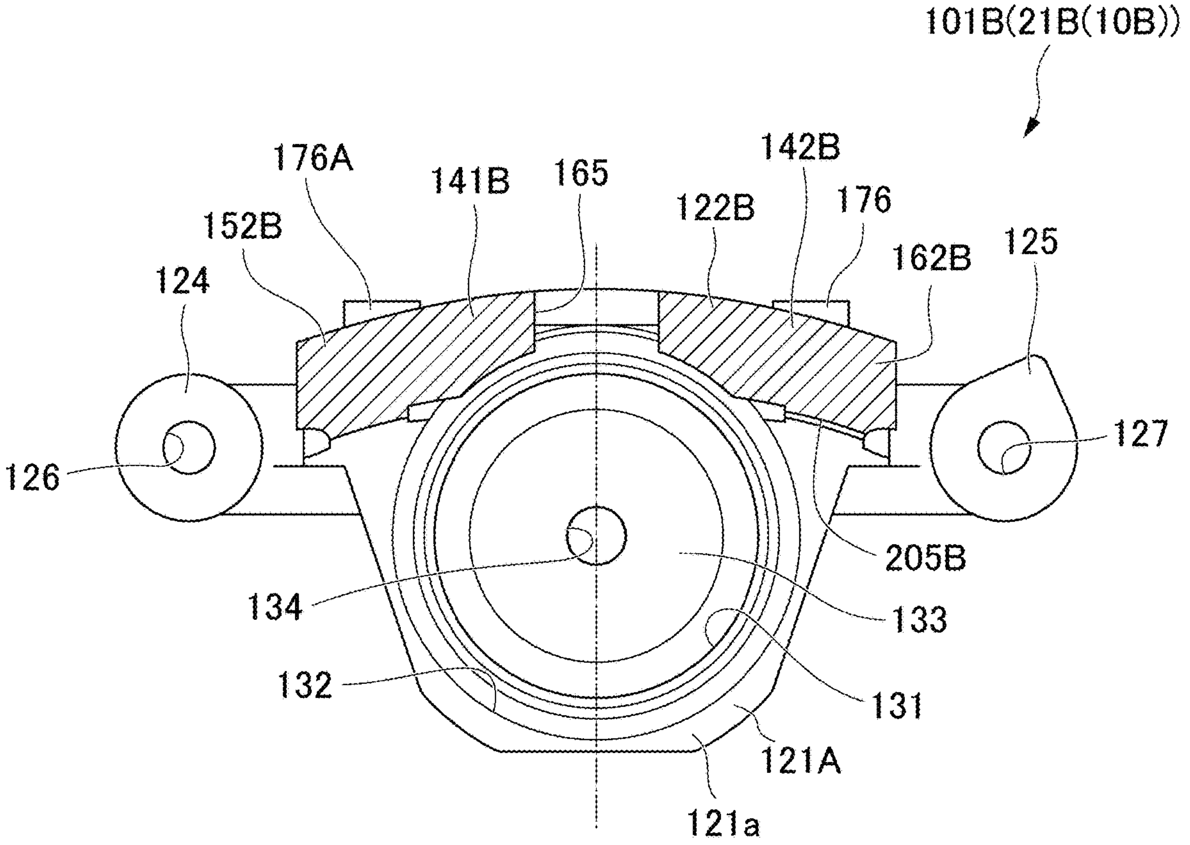
FIG. 11 is a cross-sectional view along line XI-XI of FIG. 10, illustrating the caliper main body part of the disc brake of the third embodiment.
Figure 12:
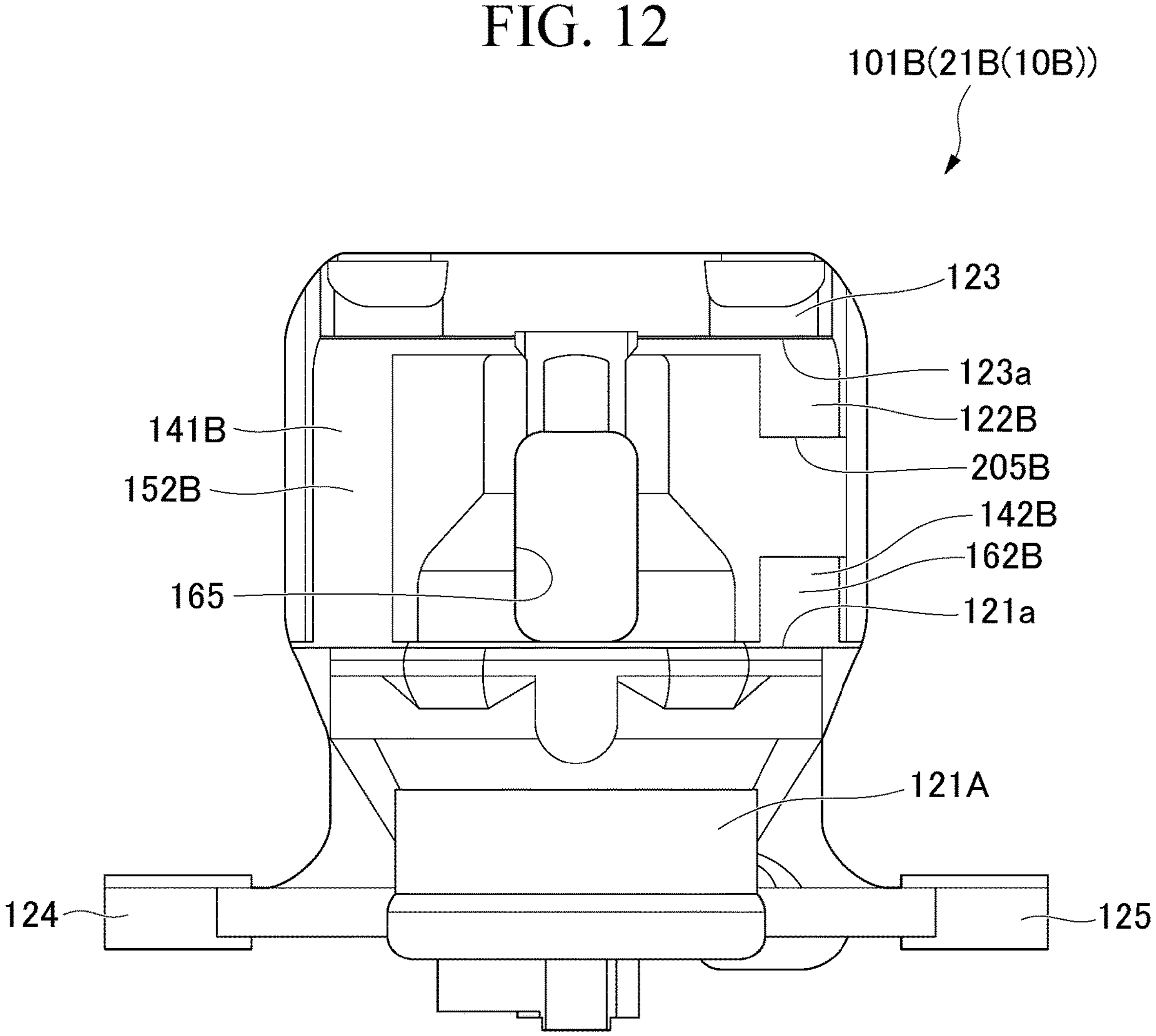
FIG. 12 is a bottom view illustrating the caliper main body part of the disc brake of the third embodiment.

In the third embodiment, as illustrated in FIGS. 10 to 12, a caliper main body part 101B that is partially different from the caliper main body part 101A is used. Therefore, a brake caliper 21B of the third embodiment includes the caliper main body part 101B that is partially different from the caliper main body part 101A. A disc brake 10B of the third embodiment includes the brake caliper 21B that is partially different from the brake caliper 21A.

The caliper main body part 101B is also seamlessly and integrally formed by casting and has a substantially mirror-symmetrical shape with a radial direction reference line and a radial direction reference plane passing through a center position in a disc circumferential direction. The caliper main body part 101B includes a bridge part 122B that is partially different from the bridge part 122A.

The rib 171A is not provided on the bridge part 122B. The bridge part 122B includes a first bridge part 141B that is partially different from the first bridge part 141A, and the first bridge part 141B includes a first section part 151B that is partially different from the first section part 151A, and a second section part 152B that is partially different from the second section part 152A. The second section part 152B is also a section between an opening end portion 132 and a pressing part 123 in the first bridge part 141B, and a section between an end surface 121*a* and an end surface 123*a* in the first bridge part 141B. The first section part 151B and the second section part 152B differ from the first section part 151A and the second section part 152A in that the rib 171A is not provided.

The bridge part 122B includes a second bridge part 142B that is partially different from the second bridge part 142, and the second bridge part 142B includes a second section part 162B that is partially different from the second section part 162. The second section part 162B is also a section between the opening end portion 132 and the pressing part 123 in the second bridge part 142B, and a section between the end surface 121*a* and the end surface 123*a* in the second bridge part 142B. The second section part 162B of the second bridge part 142B includes a cast-out part 205B recessed outward in the disc radial direction from an end portion on a disc radial direction inner side. The cast-out part 205B extends in a disc axial direction. The cast-out part 205B is provided to be recessed in a direction away from a first friction pad 26 on a side of the second section part 162B in a direction toward the first friction pad 26 in a plane perpendicular to the disc axial direction. The first bridge part 141B and the second bridge part 142B are also formed with the radial direction reference plane as a boundary. A mold 181B used when the caliper main body part 101B is cast includes a cavity 182B for forming the caliper main body part 101B and a sprue 183B for pouring a molten metal into the cavity 182B. The sprue 183B is disposed to face an end portion of the second section part 152B of the first bridge part 141B on a disc circumferential direction outer side. Therefore, in the caliper main body part 101B immediately after casting, a sprue remaining portion 185B formed by solidification of the molten metal that has been in the sprue 183B remains at the end portion of the second section part 152B of the first bridge part 141B on the disc circumferential direction outer side.

Therefore, the caliper main body part 101B, in a state of a finished product, has a sprue mark 191B, which is a cut surface remaining after the sprue remaining portion 185B is removed, at the end portion of the second section part 152B of the first bridge part 141B on the disc circumferential direction outer side. The caliper main body part 101B has a casting surface around the sprue mark 191B. The sprue mark 191B is a mark of the sprue 183B formed at the time of casting the caliper main body part 101B. In other words, the sprue mark 191B formed at the time of casting the caliper main body part 101B is provided on the first bridge part 141B.

When the caliper main body part 101B is divided by a straight line that bisects a line segment connecting a center of a first pin disposition part 124 and a center of a second pin disposition part 125 when the caliper main body part 101B is viewed from the disc axial direction, the brake caliper 21B has a shape in which a moment of inertia of area of the caliper main body part 101B on the first bridge part 141B side in which the sprue mark 191B is provided is larger than a moment of inertia of area of the caliper main body part 101B on the second bridge part 142B side due to the provision of the cast-out part 205B on the second bridge part 142B side.

The caliper main body part 101B has a shape in which a moment of inertia of area of the first bridge part 141B is larger than a moment of inertia of area of the second bridge part 142B due to the provision of the cast-out part 205B on the second bridge part 142B side.

The caliper main body part 101B has a shape in which the moment of inertia of area of the second section part 152B of the first bridge part 141B is larger than the moment of inertia of area of the second section part 162B of the second bridge part 142B due to the provision of the cast-out part 205B on the second section part 162B.

The caliper main body part 101B is cast by steps including a step of preparing the mold 181B for the caliper main body part 101B having a shape in which the moment of inertia of area of the caliper main body part 101B on the first bridge part 141B side in which the sprue mark 191B is provided is larger than the moment of inertia of area of the caliper main body part 101B on the second bridge part 142B side due to the provision of the cast-out part 205B on the second bridge part 142B side when the caliper main body part 101B is divided by a straight line that bisects a line segment connecting the center of the first pin disposition part 124 and the center of the second pin disposition part 125 when the caliper main body part 101B is viewed from the disc axial direction, and a second step of pouring the molten metal into the mold 181B from the first bridge part 141B side.

The caliper main body part 101B is cast by steps including the step of preparing the mold 181B for the caliper main body part 101B having a shape in which the moment of inertia of area of the first bridge part 141B is larger than the moment of inertia of area of the second bridge part 142B due to the provision of the cast-out part 205B on the second bridge part 142B side, and the second step of pouring the molten metal into the mold 181B from the first bridge part 141B side.

The caliper main body part 101B is cast by steps including the step of preparing the mold 181B for the caliper main body part 101B having a shape in which the moment of inertia of area of the second section part 152B of the first bridge part 141B is larger than the moment of inertia of area of the second section part 162B of the second bridge part 142B due to the provision of the cast-out part 205B on the second section part 162B side, and the second step of pouring the molten metal into the mold 181B from the first bridge part 141B side.

Here, a direction of the above-described moment of inertia of area of the first bridge part 141B and the second bridge part 142B is a direction in which the caliper main body part 101B elastically deforms in the disc axial direction. The cast-out part 205B extends in this disc axial direction.

Also, the above-described moment of inertia of area of the first bridge part 141B is obtained from a cross section of the second section part 152B which is a section between the opening end portion 132 of a cylinder hole 131 facing the first friction pad 26 and the pressing part 123 of a second friction pad 27 in the disc axial direction. The above-described moment of inertia of area of the second bridge part 142B is obtained from a cross section of the second section part 162B which is a section between the opening end portion 132 and the pressing part 123 in the disc axial direction.

When the caliper main body part 101B is divided by a straight line that bisects a line segment connecting the center of the first pin disposition part 124 and the center of the second pin disposition part 125 when viewed from the disc axial direction, the brake caliper 21B has a shape in which a cross-sectional area of the caliper main body part 101B on the first bridge part 141B side in which the sprue mark 191B is provided is larger than a cross-sectional area of the caliper main body part 101B on the second bridge part 142B side due to the provision of the cast-out part 205B on the second bridge part 142B side.

The caliper main body part 101B has a shape in which a cross-sectional area of a cross section of the second section part 152B of the first bridge part 141B in a plane passing through the cast-out part 205B and perpendicular to the disc axis is larger than a cross-sectional area of a cross section of the second section part 162B of the second bridge part 142B in the same plane due to the provision of the cast-out part 205B on the second section part 162B side.

In the brake caliper 21B and the disc brake 10B including the same according to the third embodiment, the above-described moment of inertia of area of the first bridge part 141B of the caliper main body part 101B is larger than the above-described moment of inertia of area of the second bridge part 142B by providing the cast-out part 205B on the first friction pad 26 side in a plane perpendicular to the disc axial direction in the second bridge part 142B. A rigidity of the caliper main body part 101B can be easily adjusted by the cast-out part 205B.

Also, the above-described moment of inertia of area of the first bridge part 141B of the caliper main body part 101B is obtained from a cross section of the second section part 152B which is a section between the opening end portion 132 of the cylinder hole 131 facing the first friction pad 26 and the pressing part 123 of the second friction pad 27 in the disc axial direction. Also, the above-described moment of inertia of area of the second bridge part 142B is obtained from a cross section of the second section part 162B which is a section between the opening end portion 132 and the pressing part 123 in the disc axial direction. Therefore, the rigidity of the caliper main body part 101B can be effectively adjusted.

Fourth Embodiment

Next, a fourth embodiment will be described mainly on the basis of FIGS. 13 to 15, focusing on differences from the second embodiment. Further, parts common to those in the second embodiment will be denoted by the same terms and the same reference signs.

Figure 13:
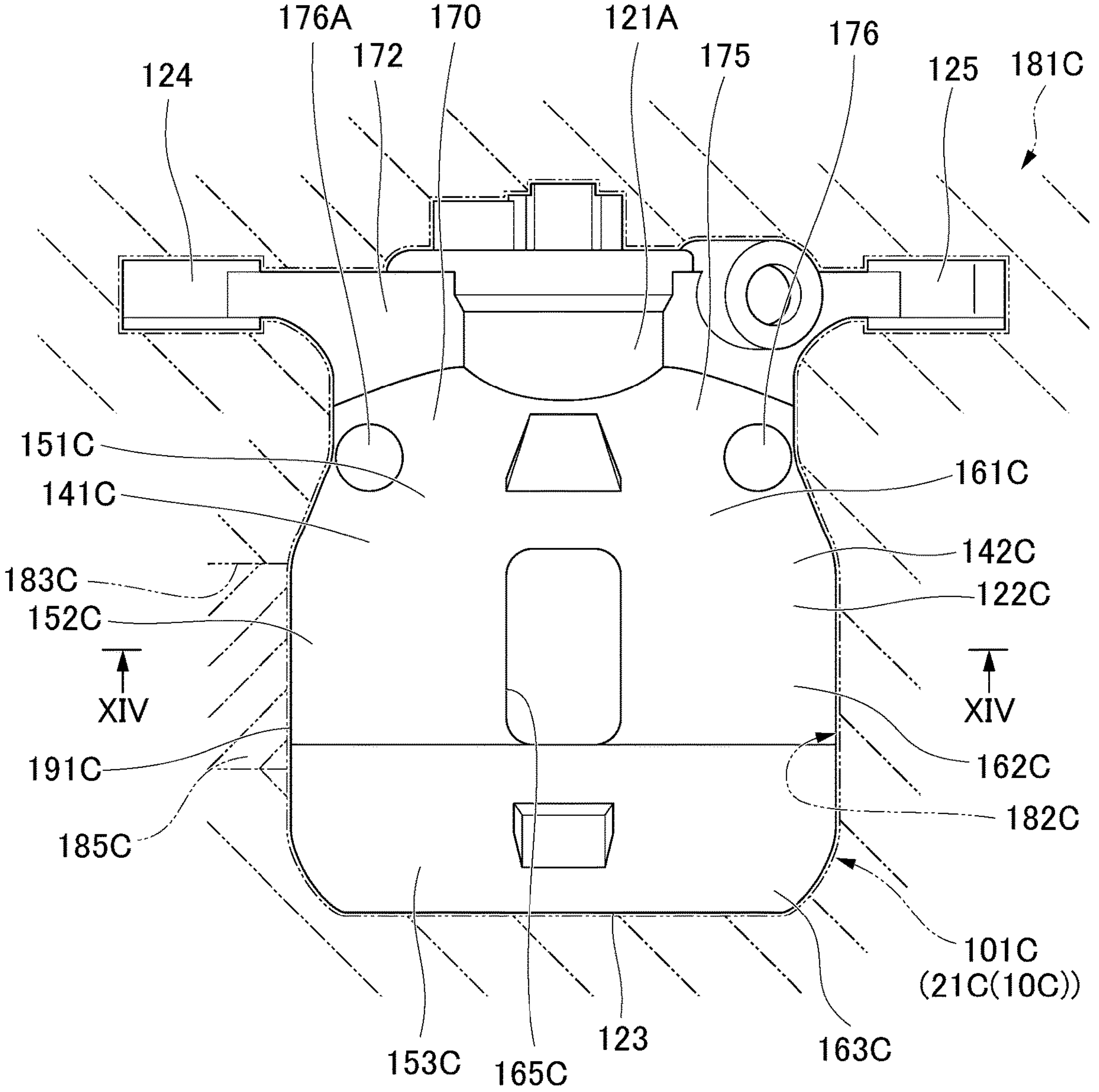
FIG. 13 is a plan view illustrating a caliper main body part of a disc brake of a fourth embodiment.
Figure 14:
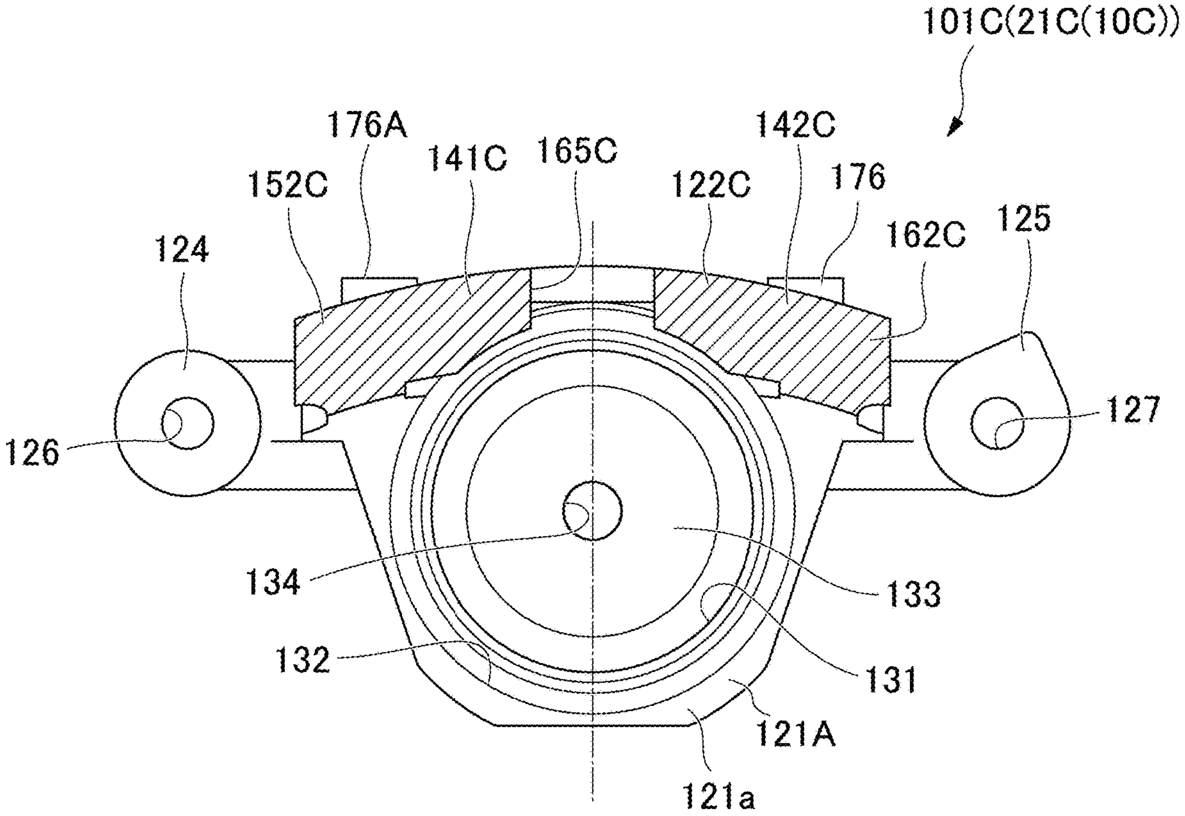
FIG. 14 is a cross-sectional view along line XIV-XIV of FIG. 13, illustrating the caliper main body part of the disc brake of the fourth embodiment.

In the fourth embodiment, as illustrated in FIGS. 13 and 14, a caliper main body part 101C that is partially different from the caliper main body part 101A is used. Therefore, a brake caliper 21C of the fourth embodiment includes the caliper main body part 101C that is partially different from the caliper main body part 101A. A disc brake 10C of the fourth embodiment includes the brake caliper 21C that is partially different from the brake caliper 21A.

The caliper main body part 101C is also seamlessly and integrally formed by casting and has a substantially mirror-symmetrical shape with a radial direction reference line and a radial direction reference plane passing through a center position in a disc circumferential direction. The caliper main body part 101C includes a bridge part 122C that is partially different from the bridge part 122A.

The rib 171A is not provided in the bridge part 122C. The bridge part 122C includes a first bridge part 141C that is partially different from the first bridge part 141A, and the first bridge part 141C includes a first section part 151C that is partially different from the first section part 151A, a second section part 152C that is partially different from the second section part 152A, and a third section part 153C that is partially different from the third section part 153A. The second section part 152C is also a section between an opening end portion 132 and a pressing part 123 in the first bridge part 141C, and a section between an end surface 121*a* and an end surface 123*a* in the first bridge part 141C.

The bridge part 122C includes a second bridge part 142C that is partially different from the second bridge part 142, and the second bridge part 142C includes a first section part 161C that is partially different from the first section part 161, a second section part 162C that is partly different from the second section part 162, and a third section part 163C that is partly different from the third section part 163. The second section part 162C is also a section between the opening end portion 132 and the pressing part 123 in the second bridge part 142C, and a section between the end surface 121*a* and the end surface 123*a* in the second bridge part 142C. The first bridge part 141C and the second bridge part 142C are also formed with the radial direction reference plane as a boundary.

In the bridge part 122C, a through hole 165C penetrating the bridge part 122C in a disc axial direction is formed at a position across the second section part 152C and the second section part 162C.

In the caliper main body part 101C, a cross-sectional area of a cross section of the second bridge part 142C in a plane perpendicular to a disc axis is larger than a cross-sectional area of a cross section of the first bridge part 141C in a plane perpendicular to the disc axis.

Specifically, a cross-sectional area of a cross section of the second section part 162C of the second bridge part 142C in a plane passing through the through hole 165C and perpendicular to the disc axis is larger than a cross-sectional area of a cross section of the second section part 152C of the first bridge part 141C in the same plane. In other words, the above-described cross-sectional area of the first bridge part 141C is obtained from the cross section of the second section part 152C of the first bridge part 141C, and the above-described cross-sectional area of the second bridge part 142C is obtained from the cross section of the second section part 162C.

Then, the first section part 151C and the third section part 153C are formed to be continuous with the second section part 152C according to a size of the second section part 152C, and the first section part 161C and the third section part 163C are also formed to be continuous with the second section part 162C according to a size of the second section part 162C.

A mold 181C used when the caliper main body part 101C is cast includes a cavity 182C for forming the caliper main body part 101C and a sprue 183C for pouring a molten metal into the cavity 182C. The sprue 183C is disposed to face an end portion of the second section part 152C of the first bridge part 141C on a disc circumferential direction outer side. Therefore, in the caliper main body part 101C immediately after casting, a sprue remaining portion 185C formed by solidification of the molten metal that has been in the sprue 183C remains at the end portion of the second section part 152C of the first bridge part 141C on the disc circumferential direction outer side.

Therefore, the caliper main body part 101C, in a state of a finished product, has a sprue mark 191C, which is a cut surface remaining after the sprue remaining portion 185C is removed, at the end portion of the second section part 152C of the first bridge part 141C on the disc circumferential direction outer side. The caliper main body part 101C has a casting surface around the sprue mark 191C. The sprue mark 191C is a mark of the sprue 183C formed at the time of casting the caliper main body part 101C. In other words, the sprue mark 191C formed at the time of casting the caliper main body part 101C is provided on the first bridge part 141C.

When the caliper main body part 101C is divided by a straight line that bisects a line segment connecting a center of a first pin disposition part 124 and a center of a second pin disposition part 125 when the caliper main body part 101C is viewed from the disc axial direction, the brake caliper 21C has a shape in which a moment of inertia of area of the caliper main body part 101C on the first bridge part 141C side in which the sprue mark 191C is provided is larger than a moment of inertia of area of the caliper main body part 101C on the second bridge part 142C side.

The caliper main body part 101C has a shape in which the moment of inertia of area of the first bridge part 141C is larger than the moment of inertia of area of the second bridge part 142C.

The caliper main body part 101C has a shape in which the moment of inertia of area of the second section part 152C of the first bridge part 141C is larger than the moment of inertia of area of the second section part 162C of the second bridge part 142C.

The caliper main body part 101C is cast by steps including a step of preparing the mold 181C for the caliper main body part 101C having a shape in which the moment of inertia of area of the caliper main body part 101C on the first bridge part 141C side in which the sprue mark 191C is provided is larger than the moment of inertia of area of the caliper main body part 101C on the second bridge part 142C side when the caliper main body part 101C is divided by a straight line that bisects a line segment connecting the center of the first pin disposition part 124 and the center of the second pin disposition part 125 when the caliper main body part 101C is viewed from the disc axial direction, and a second step of pouring the molten metal into the mold 181C from the first bridge part 141C side.

The caliper main body part 101C is cast by steps including the step of preparing the mold 181C for the caliper main body part 101C having a shape in which the moment of inertia of area of the first bridge part 141C is larger than the moment of inertia of area of the second bridge part 142C, and the second step of pouring the molten metal into the mold 181C from the first bridge part 141C side.

The caliper main body part 101C is cast by steps including the step of preparing the mold 181C for the caliper main body part 101C having a shape in which the moment of inertia of area of the second section part 152C of the first bridge part 141C is larger than the moment of inertia of area of the second section part 162C of the second bridge part 142C, and the second step of pouring the molten metal into the mold 181C from the first bridge part 141C side.

Here, a direction of the above-described moment of inertia of area of the first bridge part 141C and the second bridge part 142C is a direction in which the caliper main body part 101C elastically deforms in the disc axial direction.

Also, the above-described moment of inertia of area of the first bridge part 141C is obtained from a cross section of the second section part 152C which is a section between the opening end portion 132 of a cylinder hole 131 facing a first friction pad 26 and the pressing part 123 of a second friction pad 27 in the disc axial direction. The above-described moment of inertia of area of the second bridge part 142C is obtained from a cross section of the second section part 162C which is a section between the opening end portion 132 and the pressing part 123 in the disc axial direction.

When the caliper main body part 101C is divided by a straight line that bisects a line segment connecting the center of the first pin disposition part 124 and the center of the second pin disposition part 125 when the caliper main body part 101C is viewed from the disc axial direction, the brake caliper 21C has a shape in which a cross-sectional area of the caliper main body part 101C on the second bridge part 142C side is larger than a cross-sectional area of the caliper main body part 101C on the first bridge part 141C side in which the sprue mark 191C is provided.

The caliper main body part 101C has a shape in which a cross-sectional area of a cross section of the second section part 162C of the second bridge part 142C in a plane perpendicular to the disc axial direction is larger than a cross-sectional area of a cross section of the second section part 152C of the first bridge part 141C in the same plane.

The caliper main body part 101C has a shape in which a cross-sectional area of the cross section of the second section part 162C of the second bridge part 142C in a plane passing through the through hole 165C and perpendicular to the disc axial direction is larger than a cross-sectional area of the cross section of the second section part 152C of the first bridge part 141C in the same plane.

The caliper main body part 101C is cast by steps including a step of preparing the mold 181C for the caliper main body part 101C having a shape in which a cross-sectional area of the caliper main body part 101C on the second bridge part 142C side is larger than a cross-sectional area of the caliper main body part 101C on the first bridge part 141C in which the sprue mark 191C is provided when the caliper main body part 101C is divided by a straight line that bisects a line segment connecting the center of the first pin disposition part 124 and the center of the second pin disposition part 125 when the caliper main body part 101C is viewed from the disc axial direction, and a second step of pouring the molten metal into the mold 181C from the first bridge part 141C side.

The mold 181C is used for the caliper main body part 101C having a shape in which a cross-sectional area of the cross section of the second section part 162C of the second bridge part 142C in a plane perpendicular to the disc axial direction is larger than a cross-sectional area of the cross section of the second section part 152C of the first bridge part 141C in the same plane.

The mold 181C is used for the caliper main body part 101C having a shape in which a cross-sectional area of the cross section of the second section part 162C of the second bridge part 142C in a plane passing through the through hole 165C and perpendicular to the disc axial direction is larger than a cross-sectional area of the cross section of the second section part 152C of the first bridge part 141C in the same plane.

As described above, the caliper main body part 101C has a shape in which the moment of inertia of area of the second section part 152C of the first bridge part 141C is larger than the moment of inertia of area of the second section part 162C of the second bridge part 142C. In addition, the caliper main body part 101C has a shape in which a cross-sectional area of the cross section of the second section part 162C of the second bridge part 142C in a plane perpendicular to the disc axial direction is larger than a cross-sectional area of the cross section of the second section part 152C of the first bridge part 141C in the same plane.

Figure 15:
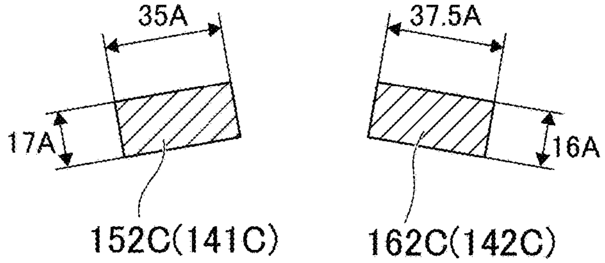
FIG. 15 is a cross-sectional view schematically illustrating a bridge part of the caliper main body part of the disc brake of the fourth embodiment.

For example, as schematically illustrated in FIG. 15, it is assumed that a width of the second section part 152C of the first bridge part 141C in the disc circumferential direction is 35 A and a height thereof in the disc radial direction is 17 A, and a width of the second section part 162C of the second bridge part 142C is 37.5 A and a height thereof in the disc radial direction is 16 A. Then, a ratio of the moment of inertia of area of the second section part 152C to the moment of inertia of area of the second section part 162C is 103:100. That is, the moment of inertia of area of the second section part 152C is larger than the moment of inertia of area of the second section part 162C. Also, at this time, a ratio of the cross-sectional area of the second section part 152C to the cross-sectional area of the second section part 162C is 99:100. That is, the cross-sectional area of the second section part 162C is larger than the cross-sectional area of the second section part 152C.

In the brake caliper 21C and the disc brake 10C including the same according to the fourth embodiment, when the caliper main body part 101C is divided by a straight line that bisects a line segment connecting the center of the first pin disposition part 124 and the center of the second pin disposition part 125 when viewed from the disc axial direction, the caliper main body part 101C has a shape in which the cross-sectional area of the caliper main body part 101C on the second bridge part 142C side is larger than the cross-sectional area of the caliper main body part 101C on the first bridge part 141C in which the sprue mark 191C is provided. That is, a difference is provided in a finished shape of the caliper main body part 101C so that the cross-sectional area of the caliper main body part 101C on the second bridge part 142C side, which is on the symmetrical side of the first bridge part 141C, is larger than the cross-sectional area of the caliper main body part 101C on the first bridge part 141C which is in the vicinity of the sprue mark 191C. Specifically, the caliper main body part 101C has a finished shape in which a casting volume of the second section part 162C of the second bridge part 142C, which is on the symmetrical side with respect to the second section part 152C, is increased compared to that in the second section part 152C of the first bridge part 141C which is in the vicinity of the sprue mark 191C. In this manner, the second bridge part 142C on a side opposite to the sprue 183C is made more difficult to be cooled than the first bridge part 141C on the sprue 183C side during the casting. Thereby, a difference in cooling rate of the molten cast iron for casting the caliper main body part 101C can be curbed, unevenness of the rigidity within the caliper main body part 101C due to a difference in ductility caused when there is the above-described difference can be canceled out by the shape without casting an insert material, and thus the unevenness of the rigidity can be curbed. Therefore, it is possible to curb unevenness of the rigidity while curbing an increase in costs of the brake caliper 21C and the disc brake 10C including the same.

A method for casting the brake caliper 21C of the fourth embodiment is a method for casting the caliper main body part 101C, and includes a first step of preparing the mold 181C for the caliper main body part 101C for forming the caliper main body part 101C into the above-described shape, and a second step of pouring the molten metal into the mold 181C from the first bridge part 141C side to cast the caliper main body part 101C of the brake caliper 21C. Thereby, since the caliper main body part 101C has the above-described shape, the second bridge part 142C on a side opposite to the sprue 183C is more difficult to be cooled than the first bridge part 141C on the sprue 183C side during the casting. Thereby, a difference in cooling rate of the molten cast iron for casting the caliper main body part 101C can be curbed, unevenness of the rigidity within the caliper main body part 101C due to a difference in ductility caused when there is the above-described difference can be canceled out by the shape without casting an insert material, and thus the unevenness of the rigidity can be curbed. Therefore, it is possible to curb unevenness of the rigidity while curbing an increase in costs of the brake caliper 21C and the disc brake 10C including the same.

Also, since the first bridge part 141C and the second bridge part 142C are made to have different cross-sectional areas in a plane perpendicular to the disc axial direction, it is possible to easily adjust the rigidity of the caliper main body part 101C. Therefore, it is possible to curb unevenness of the rigidity while an increase in costs of the brake caliper 21C and the disc brake 10C including the same is further curbed.

In the brake caliper 21C and the disc brake 10C including the same according to the fourth embodiment, the above-described cross-sectional area of the first bridge part 141C of the caliper main body part 101C is obtained from the cross section of the second section part 152C, and the above-described cross-sectional area of the second bridge part 142C is obtained from the cross section of the second section part 162C. Therefore, it is possible to effectively adjust the rigidity of the caliper main body part 101C.

Further, as a measure to make the second bridge part 142C on a side opposite to the sprue 183C more difficult to be cooled than the first bridge part 141C on the sprue 183C side during the casting, in addition to devising the shape of the casting as described above, it can also be handled on a side of a manufacturing device. For example, providing a device for heating a side opposite to the sprue 183C in the mold or the like may be performed to reduce the difference between the cooling rate on the sprue 183C side and the cooling rate on a side symmetrical to the sprue 183C. Also in this way, the rigidity of the finished casting can be made uniform by making a pearlite-forming tendency of the casting uniform.

Fifth Embodiment

Next, a fifth embodiment will be described mainly on the basis of FIGS. 16 and 17, focusing on differences from the first embodiment. Further, parts common to those in the first embodiment will be denoted by the same terms and the same reference signs.

Figure 16:
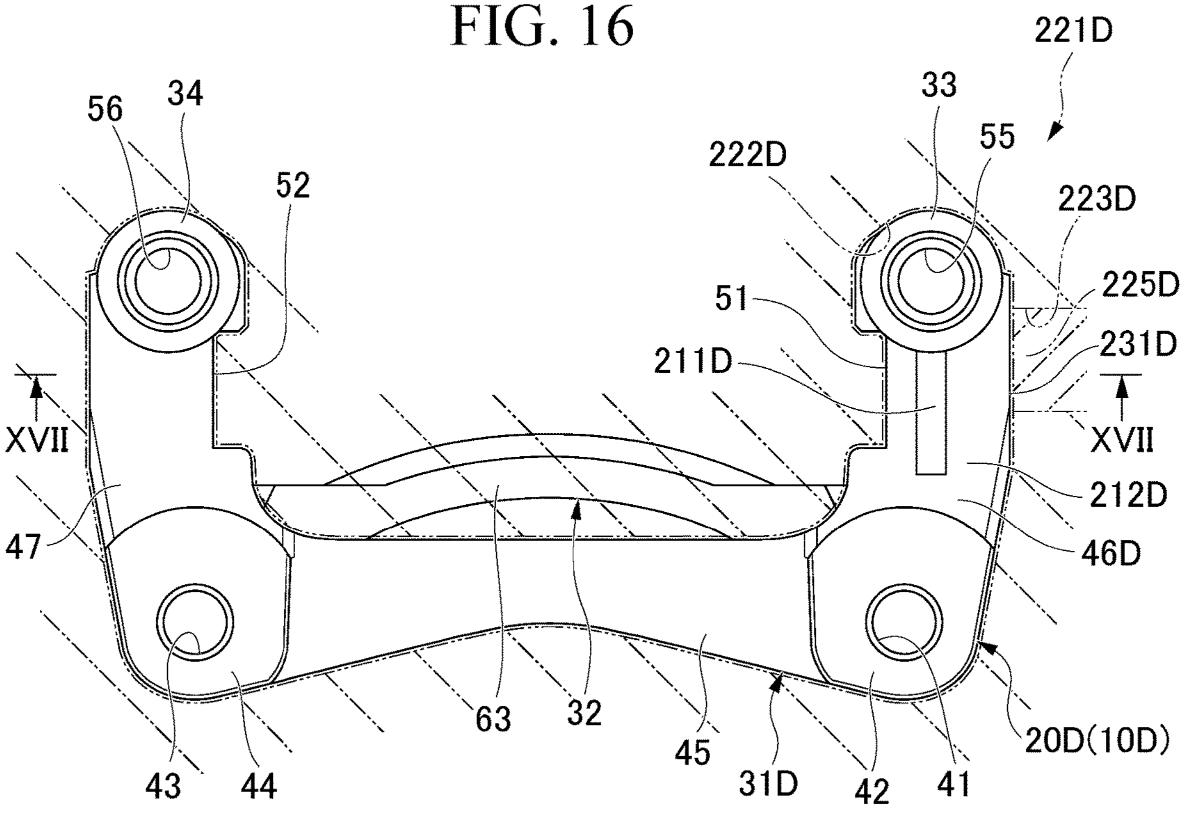
FIG. 16 is a rear view illustrating a brake carrier of a disc brake of a fifth embodiment.
Figure 17:
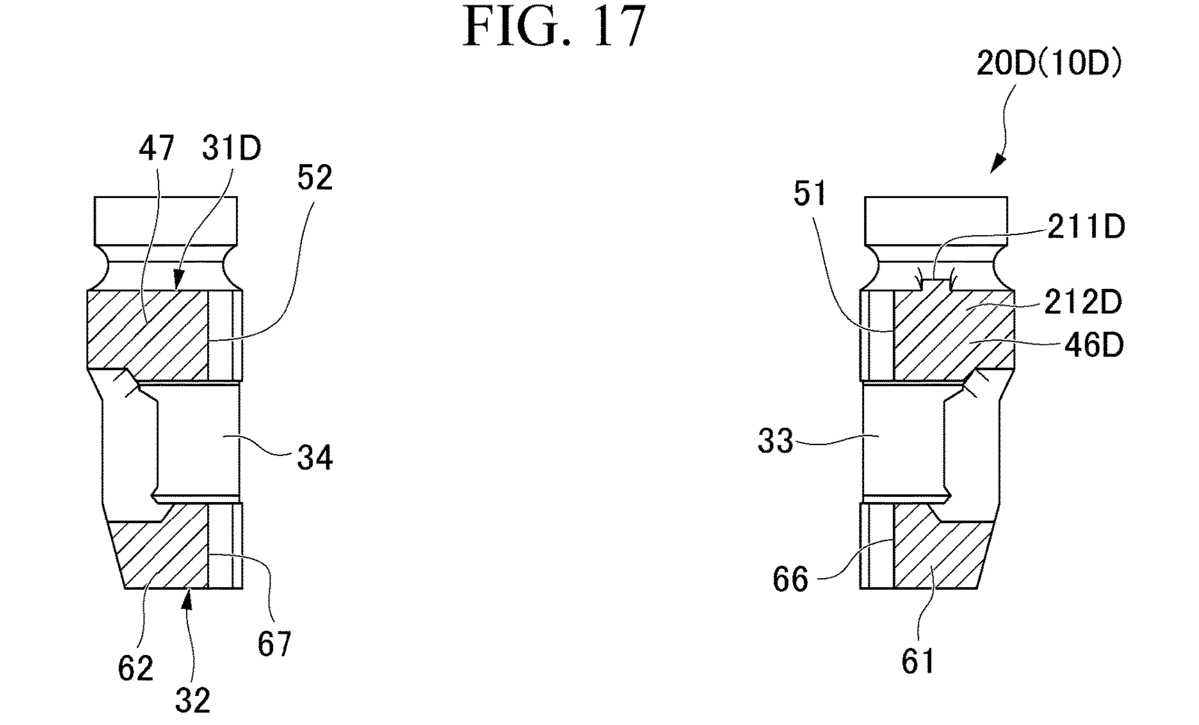
FIG. 17 is a cross-sectional view along line XVII-XVII of FIG. 16, illustrating the brake carrier of the disc brake of the fifth embodiment.

In the fifth embodiment, as illustrated in FIGS. 16 and 17, a brake carrier 20D that is partially different from the brake carrier 20 is used. Therefore, a disc brake 10D of the fifth embodiment includes the brake carrier 20D that is partially different from the brake carrier 20.

The brake carrier 20D includes an inner disposition part 31D that is partially different from the inner disposition part 31. The inner disposition part 31D includes a first connection part 46D having a rib 211D on an inner side in a disc axial direction. The first connection part 46D also extends in a direction of a first pin disposition part 124 of a brake caliper 21 from a first fixing part 42 in a plane perpendicular to the disc axial direction. The first connection part 46D includes the rib 211D that protrudes from a first connection main body part 212D in a direction away from a first friction pad 26 in the disc axial direction. The first connection main body part 212D is a portion of the first connection part 46D excluding the rib 211D, and has the same shape as the first connection part 46. The rib 211D extends in a disc radial direction and parallel to a radial direction reference line. The first connection part 46D is positioned in a first section on an outer side of an inner beam part 45 and on an inner side of a first connection part 33 and the first pin disposition part 124 in the disc radial direction. The rib 211D is also positioned in the first section.

A mold 221D used when the brake carrier 20D is cast includes a cavity 222D for forming the brake carrier 20D and a sprue 223D for pouring a molten metal into the cavity 222D. The sprue 223D is disposed to face an end portion of the first connection part 46D on a side opposite to a second connection part 47 in a disc circumferential direction. Therefore, in the brake carrier 20D immediately after casting, a sprue remaining portion 225D formed by solidification of the molten metal that has been in the sprue 223D remains at the end portion of the first connection part 46D on a side opposite to the second connection part 47 in the disc circumferential direction. The sprue remaining portion 225D is scraped off after casting. Therefore, the brake carrier 20D, in a state of a finished product, has a sprue mark 231D, which is a cut surface remaining after the sprue remaining portion 225D is removed, at the end portion of the first connection part 46D on a side opposite to the second connection part 47 in the disc circumferential direction. The brake carrier 20D has a casting surface around the sprue mark 231D. The sprue mark 231D is a mark of the sprue 223D formed at the time of casting the brake carrier 20D. In other words, the sprue mark 231D formed at the time of casting the brake carrier 20D is provided on the first connection part 46D.

The brake carrier 20D has a shape in which a moment of inertia of area of the first connection part 46D in which the sprue mark 231D is provided is larger than a moment of inertia of area of the second connection part 47 due to provision of the rib 211D.

The brake carrier 20D is cast by steps including a step of preparing the mold 221D for the brake carrier 20D having a shape in which the moment of inertia of area of the first connection part 46D in which the sprue mark 231D is provided is larger than the moment of inertia of area of the second connection part 47 due to the provision of the rib 211D, and a second step of pouring the molten metal into the mold 221D from the first connection part 46D side.

Here, a direction of the above-described moment of inertia of area of the first connection part 46D and the second connection part 47 is a direction in which the brake carrier 20D elastically deforms in the disc circumferential direction, that is, in a rotation direction of a disc 11, when the vehicle travels forward.

Also, the above-described moment of inertia of area of the first connection part 46D is obtained from a cross section of the first section on an outer side of the inner beam part 45 and on an inner side of the first connection part 33 and the first pin disposition part 124. The above-described moment of inertia of area of the second connection part 47 is obtained from a cross section of a second section on an outer side of the inner beam part 45 and on an inner side of a second connection part 34 and a second pin disposition part 125.

The brake carrier 20D has a shape in which a cross-sectional area of the first connection part 46D in which the sprue mark 231D is provided is larger than a cross-sectional area of the second connection part 47 due to the provision of the rib 211D.

The brake carrier 20D has a shape in which a cross-sectional area of a cross section of the first connection part 46D in a plane passing through the rib 211D and perpendicular to the radial direction reference line is larger than a cross-sectional area of a cross section of the second connection part 47 in the same plane due to the provision of the rib 211D.

At the time of casting using the mold 221D for the brake carrier 20D, the second connection part 47 of the brake carrier 20D on a side opposite to the sprue 223D dissipates heat to the poured mold 221D for the high-temperature molten cast iron faster than the first connection part 46D in the vicinity of the sprue 223D, and as a result, the molten cast iron thereof has a high cooling rate and is likely to form pearlite. The second connection part 47 with a strong pearlite-forming tendency has a cast iron composition that is hard and less ductile. On the other hand, the first connection part 46D on the sprue 223D side has a lower cooling rate because of an intermittent inflow of the high-temperature molten cast iron, making it relatively easier for graphite to grow compared to the second connection part 47 on a side opposite to the sprue 223D. Thereby, the cast iron of the first connection part 46D on the sprue 223D side has a composition with high ductility. If the brake carrier has a symmetrical shape, such unevenness of rigidity occurs within the brake carrier. Then, there is a likelihood that unevenness will occur in the first friction pad 26 and the second friction pad 27 and uneven wear will occur in the first friction pad 26 and the second friction pad 27.

Therefore, it is also conceivable to adjust a rigidity of a predetermined portion by casting an insert material as described above, but there is a likelihood that casting an insert material will cause an increase in costs of the mold due to positioning of the insert material and an increase in costs due to material costs of the insert material itself.

In the brake carrier 20D and the disc brake 10D including the same of the fifth embodiment, the brake carrier 20D has a shape in which the moment of inertia of area of the first connection part 46D in which the sprue mark 231D is provided is larger than the moment of inertia of area of the second connection part 47 due to the provision of the rib 211D. That is, a difference is provided in a finished shape of the brake carrier 20D so that the moment of inertia of area of the first connection part 46D which is in the vicinity of the sprue mark 231D is larger than the moment of inertia of area of the second connection part 47 which is on the symmetrical side of the first connection part 46D. Thereby, unevenness of the rigidity within the brake carrier 20D due to a difference in ductility caused by the difference in cooling rate of the molten cast iron for casting the brake carrier 20D can be canceled out by the shape without casting an insert material, and thus the unevenness of the rigidity can be curbed. Therefore, it is possible to curb unevenness of the rigidity while curbing an increase in costs of the brake carrier 20D and the disc brake 10D including the same.

A method for casting the brake carrier 20D of the fifth embodiment includes a first step of preparing the mold 221D for the brake carrier 20D for forming the brake carrier 20D into the above-described shape, and a second step of pouring the molten metal into the mold 221D from the first connection part 46D side to cast the brake carrier 20D. Thereby, since the brake carrier 20D has the above-described shape, unevenness of the rigidity within the brake carrier 20D due to a difference in ductility caused by the difference in cooling rate of the molten cast iron for casting the brake carrier 20D can be canceled out by the shape without casting an insert material, and thus the unevenness of the rigidity can be curbed. Therefore, it is possible to curb unevenness of the rigidity while curbing an increase in costs of the brake carrier 20D and the disc brake 10D including the same.

When unevenness of the rigidity of the brake carrier 20D is curbed as described above, uneven wear of the first friction pad 26 and the second friction pad 27 can be curbed, and deterioration in performance such as squeal noise, judder, and deterioration in drag torque due to the uneven wear can be curbed. This is specific effects obtained by applying the above-described configuration to the brake carrier 20D. The effects are particularly high in the brake carrier 20D that is mounted on a small vehicle having a narrow disposition layout in the vehicle.

Also, in the brake carrier 20D, a direction of the above-described moment of inertia of area of the first connection part 46D and the second connection part 47 is a direction in which the brake carrier 20D elastically deforms in the disc circumferential direction, that is, in the rotation direction of the disc 11, when the vehicle travels forward. Thereby, when the rigidity of the brake carrier 20D is made uniform, it is possible to curb deterioration in rigidity of the first connection part 46D side that receives a torque due to braking when the vehicle travels forward.

Also, the above-described moment of inertia of area of the first connection part 46D is obtained from the cross section of the first section on an outer side of the inner beam part 45 and on an inner side of the first connection part 33 and the first pin disposition part 124. The above-described moment of inertia of area of the second connection part 47 is obtained from the cross section of the second section on an outer side of the inner beam part 45 and on an inner side of the second connection part 34 and the second pin disposition part 125. Therefore, the rigidity of the brake carrier 20D can be effectively adjusted.

Also, since the first connection part 46D having the sprue mark 231D is positioned on a disc rotation exit side when the vehicle travels forward, when the rigidity of the brake carrier 20D is made uniform, it is possible to curb deterioration in rigidity of the first connection part 46D side that receives a torque due to braking when the vehicle travels forward.

Also, in the brake carrier 20D, the above-described moment of inertia of area of the first connection part 46D is larger than the above-described moment of inertia of area of the second connection part 47 due to the first connection part 46D having the rib 211D that protrudes in a direction away from the first friction pad 26 in the disc axial direction. Therefore, it is possible to easily adjust the rigidity of a caliper main body part 101A.

Sixth Embodiment

Next, a sixth embodiment will be described mainly on the basis of FIGS. 18 and 19, focusing on differences from the fifth embodiment. Further, parts common to those in the fifth embodiment will be denoted by the same terms and the same reference signs.

Figure 18:
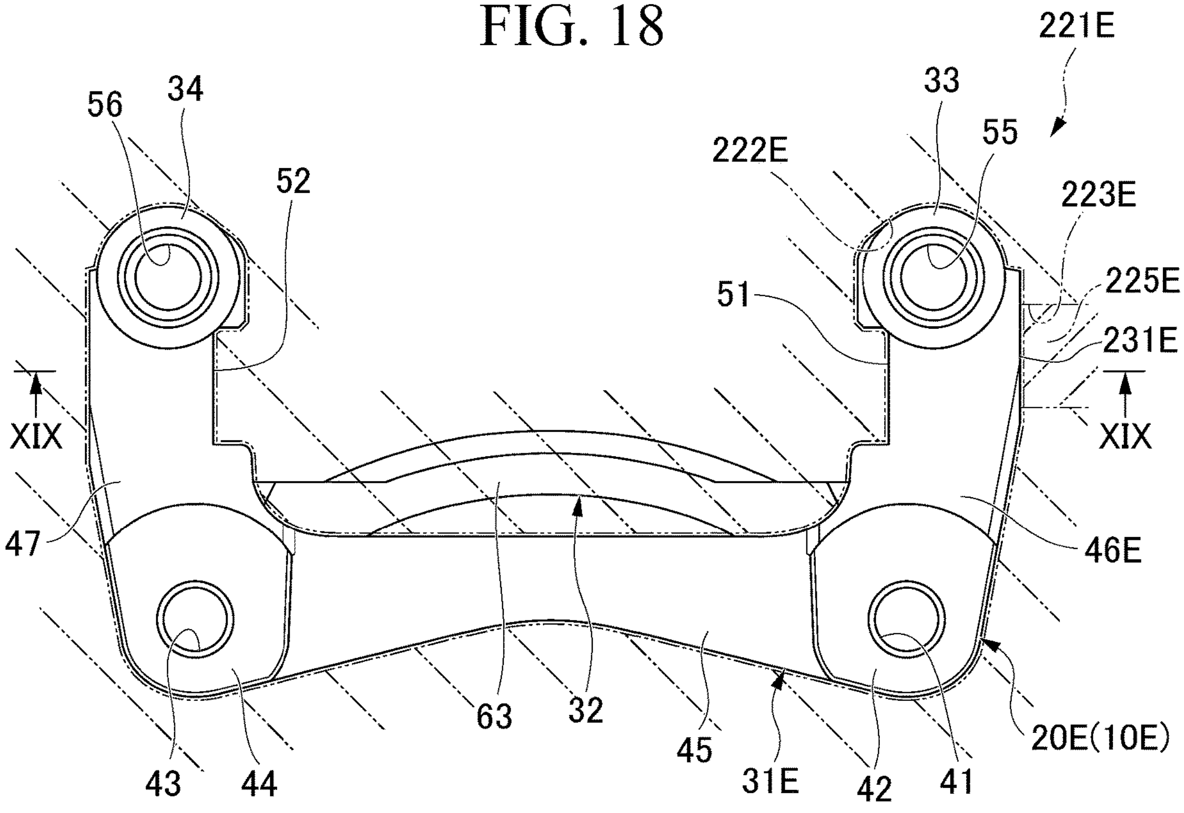
FIG. 18 is a rear view illustrating a brake carrier of a disc brake of a sixth embodiment.
Figure 19:
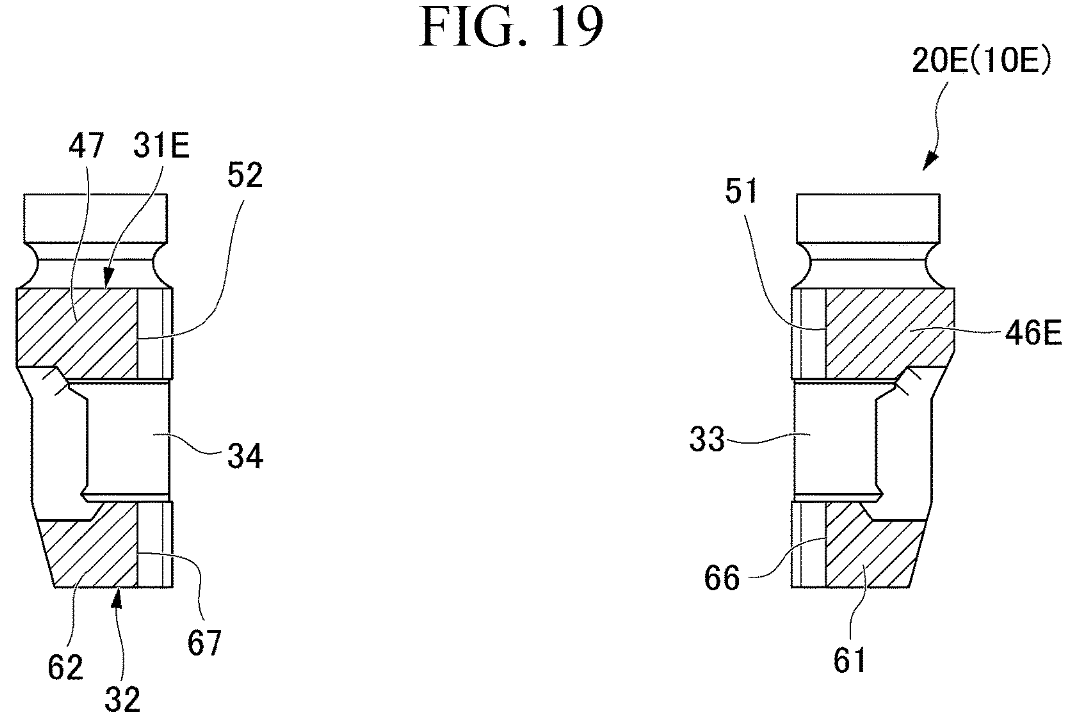
FIG. 19 is a cross-sectional view along line XIX-XIX of FIG. 18, illustrating the brake carrier of the disc brake of the sixth embodiment.

In the sixth embodiment, as illustrated in FIGS. 18 and 19, a brake carrier 20E that is partially different from the brake carrier 20D is used. Therefore, a disc brake 10E of the sixth embodiment includes the brake carrier 20E that is partially different from the brake carrier 20D.

The brake carrier 20E includes an inner disposition part 31E that is partially different from the inner disposition part 31D. The inner disposition part 31E includes a first connection part 46E in which the rib 211D is not provided. The first connection part 46E also extends in a direction of a first pin disposition part 124 of a brake caliper 21 from a first fixing part 42 in a plane perpendicular to a disc axial direction. A width of the first connection part 46E in a disc circumferential direction is made larger than a width of a second connection part 47 in the disc circumferential direction. In other words, a width of the first connection part 46E in a direction in which an inner beam part extends is larger than a width of the second connection part 47 in the direction in which the inner beam part 45 extends. The first connection part 46E is positioned in a first section on an outer side of the inner beam part 45 and on an inner side of a first connection part 33 and the first pin disposition part 124 in a disc radial direction.

A mold 221E used when the brake carrier 20E is cast includes a cavity 222E for forming the brake carrier 20E and a sprue 223E for pouring a molten metal into the cavity 222E. The sprue 223E is disposed to face an end portion of the first connection part 46E on a side opposite to the second connection part 47 in the disc circumferential direction. Therefore, in the brake carrier 20E immediately after casting, a sprue remaining portion 225E formed by solidification of the molten metal that has been in the sprue 223E remains at the end portion of the first connection part 46E on a side opposite to the second connection part 47 in the disc circumferential direction. The sprue remaining portion 225E is scraped off after casting. Therefore, the brake carrier 20E, in a state of a finished product, has a sprue mark 231E, which is a cut surface remaining after the sprue remaining portion 225E is removed, at the end portion of the first connection part 46E on a side opposite to the second connection part 47 in the disc circumferential direction. The brake carrier 20E has a casting surface around the sprue mark 231E. The sprue mark 231E is a mark of the sprue 223E formed at the time of casting the brake carrier 20E. In other words, the sprue mark 231E formed at the time of casting the brake carrier 20E is provided on the first connection part 46E.

The brake carrier 20E has a shape in which a moment of inertia of area of the first connection part 46E in which the sprue mark 231E is provided is larger than a moment of inertia of area of the second connection part 47 due to the wider width of the first connection part 46E in the disc circumferential direction.

The above-described moment of inertia of area of the first connection part 46E is obtained from a cross section of the first section on an outer side of the inner beam part and on an inner side of the first connection part 33 and the first pin disposition part 124. The above-described moment of inertia of area of the second connection part 47 is obtained from a cross section of a second section on an outer side of the inner beam part 45 and on an inner side of a second connection part 34 and a second pin disposition part 125.

The brake carrier 20E is cast by steps including a step of preparing the mold 221E for the brake carrier 20E having a shape in which the moment of inertia of area of the first connection part 46E in which the sprue mark 231E is provided is larger than the moment of inertia of area of the second connection part 47 due to the wider width of the first connection part 46E in the disc circumferential direction, and a second step of pouring the molten metal into the mold 221E from the first connection part 46E side. Here, a direction of the above-described moment of inertia of area of the first connection part 46E and the second connection part 47 is a direction in which the brake carrier 20E elastically deforms in the disc circumferential direction, that is, in a rotation direction of a disc 11, when the vehicle travels forward.

The brake carrier 20E has a shape in which a cross-sectional area of the first connection part 46E in which the sprue mark 231E is provided is larger than a cross-sectional area of the second connection part 47 by making a width of the first connection part 46E in the disc circumferential direction larger than that of the second connection part 47.

The brake carrier 20E has a shape in which a cross-sectional area of a cross section of the first connection part 46E in a plane passing through a portion in the vicinity of the first connection part 33 and the first pin disposition part 124, passing through the sprue mark 231E, and perpendicular to a radial direction reference line is larger than a cross-sectional area of a cross section of the second connection part 47 in the same plane by making a width of the first connection part 46E in the disc circumferential direction larger than that of the second connection part 47.

In the brake carrier 20E and the disc brake 10E including the same according to the sixth embodiment, the brake carrier 20E is configured such that the above-described moment of inertia of area of the first connection part 46E is larger than the moment of inertia of area of the second connection part 47 by making a width of the first connection part 46E in the disc circumferential direction larger than a width of the second connection part 47 in the disc circumferential direction. Since the width of the first connection part 46E in the disc circumferential direction is adjusted as described above, the rigidity of the brake carrier 20E can be easily adjusted.

Also, the above-described moment of inertia of area of the first connection part 46E is obtained from the cross section of the first section on an outer side of the inner beam part 45 and on an inner side of the first connection part 33 and the first pin disposition part 124, and the above-described moment of inertia of area of the second connection part 47 is obtained from the cross section of the second section on an outer side of the inner beam part 45 and on an inner side of the second connection part 34 and the second pin disposition part 125. Therefore, the rigidity of the brake carrier 20E can be effectively adjusted.

Seventh Embodiment

Next, a seventh embodiment will be described mainly on the basis of FIGS. 20 and 21, focusing on differences from the first embodiment. Further, parts common to those in the first embodiment will be denoted by the same terms and the same reference signs.

Figure 20:
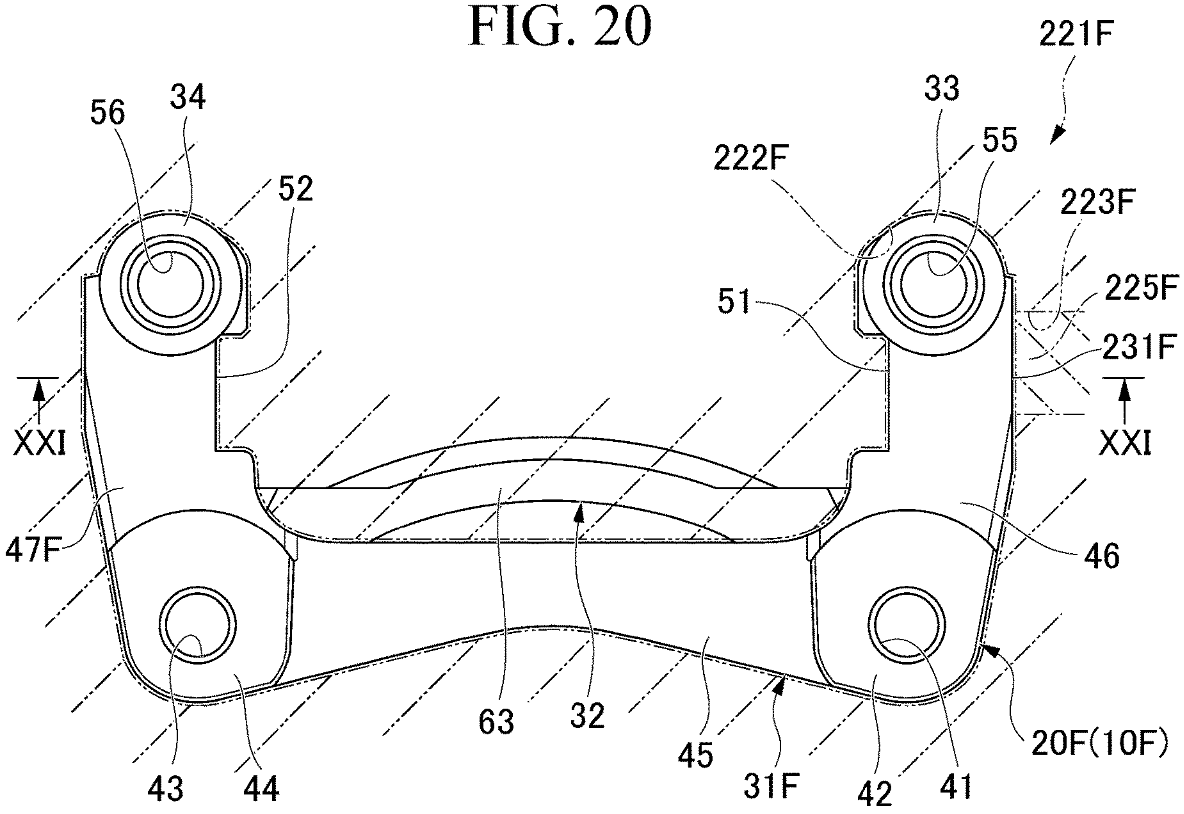
FIG. 20 is a rear view illustrating a brake carrier of a disc brake of a seventh embodiment.
Figure 21:
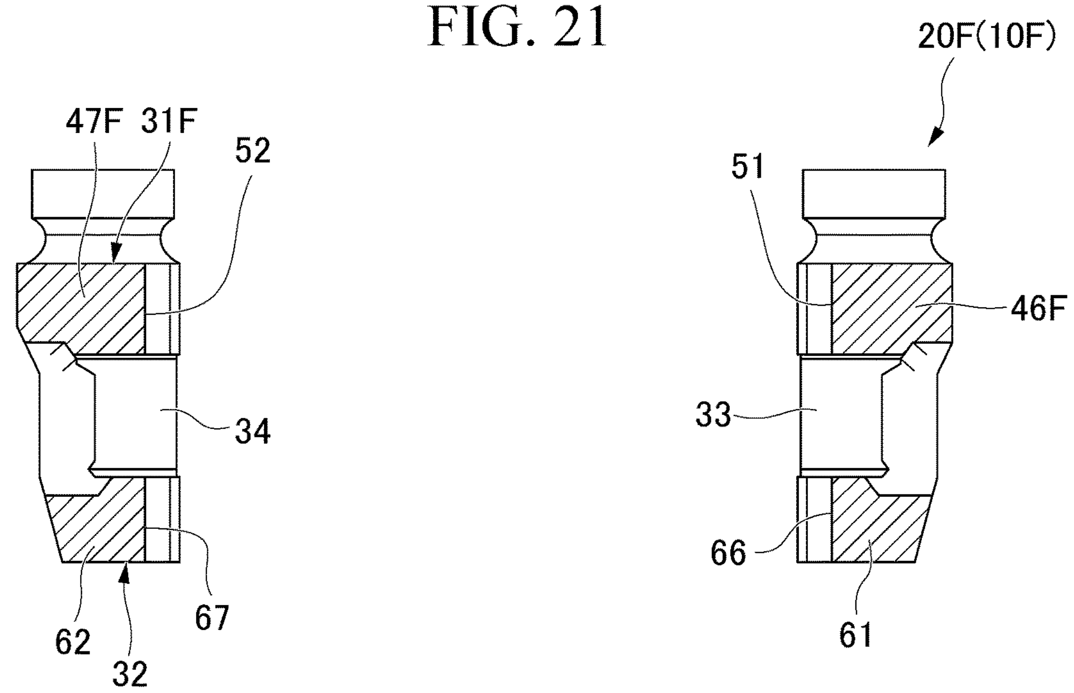
FIG. 21 is a cross-sectional view along line XXI-XXI of FIG. 20, illustrating the brake carrier of the disc brake of the seventh embodiment.

In the seventh embodiment, as illustrated in FIGS. 20 and 21, a brake carrier 20F that is partially different from the brake carrier 20 is used. Therefore, a disc brake 10F of the seventh embodiment includes the brake carrier 20F that is partially different from the brake carrier 20. The disc brake 10F of the seventh embodiment is mounted on a vehicle so that a rotation direction of a disc 11 when the vehicle travels forward is opposite to that in the disc brake 10 of the first embodiment.

The brake carrier 20F includes an inner disposition part 31F that is partially different from the inner disposition part 31. The inner disposition part 31F includes a second connection part 47F that is partially different from the second connection part 47. The second connection part 47F also extends from a second fixing part 44 in a direction of a second pin disposition part 125 of a brake caliper 21 in a plane perpendicular to a disc axial direction. A first connection part 46 is positioned in a first section on an outer side of an inner beam part 45 and on an inner side of a first connection part 33 and a first pin disposition part 124 in a disc radial direction. The second connection part 47F is positioned in a second section on an outer side of the inner beam part 45 and on an inner side of a second connection part 34 and the second pin disposition part 125 in the disc radial direction.

In the brake carrier 20F, the second fixing part 44, the second connection part 47F, and the second connection part 34 are disposed on a disc rotation exit side, and a first fixing part 42, the first connection part 46, and the first connection part 33 are disposed on a disc rotation entry side.

A mold 221F used when the brake carrier 20F is cast includes a cavity 222F for forming the brake carrier 20F and a sprue 223F for pouring a molten metal into the cavity 222F. The sprue 223F is disposed to face an end portion of the first connection part 46 on a side opposite to the second connection part 47F in a disc circumferential direction. Therefore, in the brake carrier 20F immediately after casting, a sprue remaining portion 225F formed by solidification of the molten metal that has been in the sprue 223F remains at the end portion of the first connection part 46 on a side opposite to the second connection part 47F in the disc circumferential direction. The sprue remaining portion 225F is scraped off after casting. Therefore, the brake carrier 20F, in a state of a finished product, has a sprue mark 231F, which is a cut surface remaining after the sprue remaining portion 225F is removed, at the end portion of the first connection part 46 on a side opposite to the second connection part 47F in the disc circumferential direction. The brake carrier 20F has a casting surface around the sprue mark 231F. The sprue mark 231F is a mark of the sprue 223F formed at the time of casting the brake carrier 20F. In other words, the sprue mark 231F formed at the time of casting the brake carrier 20F is provided on the first connection part 46.

The brake carrier 20F has a shape in which a cross-sectional area of the second connection part 47F is larger than a cross-sectional area of the first connection part 46 in which the sprue mark 231F is provided.

The above-described cross-sectional area of the first connection part 46 is obtained from a cross section of the first section on an outer side of the inner beam part 45 and on an inner side of the first connection part 33 and the first pin disposition part 124. The above-described cross-sectional area of the second connection part 47F is obtained from a cross section of the second section on an outer side of the inner beam part 45 and on an inner side of the second connection part 34 and the second pin disposition part 125.

The brake carrier 20F has a shape in which a cross-sectional area of a cross section of the first connection part 46 in a plane passing through a portion in the vicinity of the first connection part 33 and the first pin disposition part 124, passing through the sprue mark 231F, and perpendicular to a radial direction reference line is smaller than a cross-sectional area of a cross section of the second connection part 47F in the same plane.

The brake carrier 20F is cast by steps including a step of preparing the mold 221F for a caliper main body part 101F having a shape in which a cross-sectional area of the second connection part 47F is larger than a cross-sectional area of the first connection part 46 in which the sprue mark 231F is provided, and a second step of pouring the molten metal into the mold 221F from the first connection part 46 side.

The mold 221F is used for the brake carrier 20F having a shape in which a cross-sectional area of the cross section of the first connection part 46 in a plane passing through a portion in the vicinity of the first connection part 33 and the first pin disposition part 124, passing through the sprue mark 231F, and perpendicular to the radial direction reference line is smaller than a cross-sectional area of the cross section of the second connection part 47F in the same plane.

In the brake carrier 20F and the disc brake 10F including the same according to the seventh embodiment, the brake carrier 20F has a shape in which the cross-sectional area of the second connection part 47F is larger than the cross-sectional area of the first connection part 46 in which the sprue mark 231F is provided. That is, a difference is provided in a finished shape of the brake carrier 20F so that the cross-sectional area of the second connection part 47F, which is on the symmetrical side of the first connection part 46, is larger than the cross-sectional area of the first connection part 46 which is in the vicinity of the sprue mark 231F. Thereby, the second connection part 47F on a side opposite to the sprue 223F is more difficult to be cooled than the first connection part 46 on the sprue 223F side during the casting. Thereby, a difference in cooling rate of the molten cast iron for casting the brake carrier 20F can be curbed, unevenness of the rigidity within the brake carrier 20F due to a difference in ductility caused when there is the above-described difference can be canceled out by the shape without casting an insert material, and thus the unevenness of the rigidity can be curbed.

A method for casting the brake carrier 20F of the seventh embodiment includes a first step of preparing the mold 221F for the brake carrier 20F for forming the brake carrier 20F into the above-described shape, and a second step of pouring the molten metal into the mold 221F from the first connection part 46 side to cast the brake carrier 20F. Thereby, since the brake carrier 20F has the above-described shape, the second connection part 47F on a side opposite to the sprue 223F is more difficult to be cooled than the first connection part 46 on the sprue 223F side during the casting, unevenness of the rigidity within the brake carrier 20F due to a difference in ductility caused by the difference in cooling rate of the molten cast iron for casting the brake carrier 20F can be canceled out by the shape without casting an insert material, and thereby the unevenness of the rigidity can be curbed. Therefore, it is possible to curb unevenness of the rigidity while curbing an increase in costs of the brake carrier 20F and the disc brake 10F including the same.

Also, since the first connection part 46 and the second connection part 47F are made to have different cross-sectional areas in a plane perpendicular to the radial direction reference line, it is possible to easily adjust the rigidity of the brake carrier 20F.

Also, the above-described cross-sectional area of the first connection part 46 of the brake carrier 20F is obtained from the cross section of the first section on an outer side of the inner beam part 45 and on an inner side of the first connection part 33 and the first pin disposition part 124, and the above-described cross-sectional area of the second connection part 47F is obtained from the cross section of the second section on an outer side of the inner beam part 45 and on an inner side of the second connection part 34 and the second pin disposition part 125. Therefore, the rigidity of the brake carrier 20F can be effectively adjusted.

Also, since the second connection part 47F, which has a larger cross-sectional area than the first connection part 46 having the sprue mark 231F, is positioned on the disc rotation exit side when the vehicle travels forward, when the rigidity of the brake carrier 20F is made uniform, it is possible to improve the rigidity on the second connection part 46F side that receives a torque due to braking when the vehicle travels forward.

Further, as a measure to make the second connection part 47F on a side opposite to the sprue 223F more difficult to be cooled than the first connection part 46 on the sprue 223F side during the casting, in addition to devising the shape of the casting as described above, it can also be handled on a side of a manufacturing device. For example, providing a device for heating the side symmetrical to the sprue 223F in the mold or the like may be performed to reduce the difference between the cooling rate on the sprue 223F side and the cooling rate on a side symmetrical to the sprue 223F. Also in this way, the rigidity of the finished casting can be made uniform by making a pearlite-forming tendency of the casting uniform.

The brake caliper 21 of the first embodiment has been applied in the fifth to seventh embodiments, but the brake caliper 21A of the second embodiment, the brake caliper 21B of the third embodiment, the brake caliper 21C of the fourth embodiment, or other brake calipers may be combined with the brake carrier 20D of the fifth embodiment. Also, the brake caliper 21A of the second embodiment, the brake caliper 21B of the third embodiment, the brake caliper 21C of the fourth embodiment, or other brake calipers may be combined with the brake carrier 20E of the sixth embodiment. Also, the brake caliper 21A of the second embodiment, the brake caliper 21B of the third embodiment, the brake caliper 21C of the fourth embodiment, or other brake calipers may be combined with the brake carrier 20F of the seventh embodiment.

A first aspect of the embodiment described above includes a brake carrier (for example, brake carrier 20) fixed to a non-rotating portion of a vehicle and provided across an outer circumferential side of a disc (for example, disc 11), a first friction pad (for example, first friction pad 26) provided to be movable in the brake carrier and disposed to face one surface (for example, surface 11*a*) in an axial direction of the disc, a second friction pad (for example, second friction pad 27) provided to be movable in the brake carrier and disposed to face the other surface (for example, surface 11*b*) in the axial direction of the disc, and a brake caliper, which is a brake caliper (for example, brake caliper 21, 21A, 21B, 21C) in which a piston (for example, piston 111) pressing the first friction pad is accommodated in the axial direction of the disc, including a first slide pin (for example, first slide pin 102), a second slide pin (for example, second slide pin 103), and a caliper main body part (for example, caliper main body part 101, 101A, 101B, 101C) supported by the brake carrier via the first slide pin and the second slide pin, in which the caliper main body part includes a cylinder part (for example, cylinder part 121, 121A) having a cylinder hole (for example, cylinder hole 131) in which the piston is accommodated, a first pin disposition part (for example, first pin disposition part 124) provided on one end side of the cylinder part in a circumferential direction of the disc and having the first slide pin provided in the axial direction of the disc, a second pin disposition part (for example, second pin disposition part 125) provided on the other end side of the cylinder part in the circumferential direction of the disc and having the second slide pin provided in the axial direction of the disc, a first bridge part (for example, first bridge part 141, 141A, 141B, 141C) provided across an outer circumferential side of the disc, positioned on the first pin disposition part side in the circumferential direction of the disc, and on which a sprue mark (for example, sprue mark 191, 191A, 191B, 191C) formed at the time of casting the caliper main body part is provided, and a second bridge part (for example, second bridge part 142, 142B, or 142C) provided across an outer circumferential side of the disc and positioned on the second pin disposition part side in the circumferential direction of the disc, and has a shape in which a moment of inertia of area of the caliper main body part on the first bridge part side is larger than a moment of inertia of area of the caliper main body part on the second bridge part side when the caliper main body part is divided by a straight line that bisects a line segment connecting a center of the first pin disposition part and a center of the second pin disposition part when viewed from the axial direction of the disc.

According to a second aspect, in the first aspect, a direction of the moment of inertia of area is a direction in which the caliper main body part elastically deforms in the axial direction of the disc.

According to a third aspect, in the second aspect, the first bridge part is a section between an opening end portion (for example, opening end portion 132) of the cylinder hole facing the first friction pad and a pressing part (for example, pressing part 123) of the second friction pad in the axial direction of the disc, the second bridge part is the section, and the moment of inertia of area is obtained from a cross section of the section.

According to a fourth aspect, in the third aspect, the first bridge part includes a rib (for example, rib 171A) protruding in a direction away from the first friction pad in a plane perpendicular to the axial direction of the disc.

According to a fifth aspect, in the third aspect, the second bridge part includes a cast-out part (for example, cast-out part 205B) on a side in a direction toward the first friction pad in a plane perpendicular to the axial direction of the disc.

A sixth aspect includes a brake carrier (for example, brake carrier 20) fixed to a non-rotating portion of a vehicle and provided across an outer circumferential side of a disc (for example, disc 11), a first friction pad (for example, first friction pad 26) provided to be movable in the brake carrier and disposed to face one surface (for example, surface 11*a*) in an axial direction of the disc, a second friction pad (for example, second friction pad 27) provided to be movable in the brake carrier and disposed to face the other surface (for example, surface 11*b*) in the axial direction of the disc, and a brake caliper, which is a brake caliper (for example, brake caliper 21C) in which a piston (for example, piston 111) pressing the first friction pad is accommodated in the axial direction of the disc, including a first slide pin (for example, first slide pin 102), a second slide pin (for example, second slide pin 103), and a caliper main body part (for example, caliper main body part 101C) supported by the brake carrier via the first slide pin and the second slide pin, in which the caliper main body part includes a cylinder part (for example, cylinder part 121A) having a cylinder hole (for example, cylinder hole 131) in which the piston is accommodated, a first pin disposition part (for example, first pin disposition part 124) provided on one end side of the cylinder part in a circumferential direction of the disc and having the first slide pin provided in the axial direction of the disc, a second pin disposition part (for example, second pin disposition part 125) provided on the other end side of the cylinder part in the circumferential direction of the disc and having the second slide pin provided in the axial direction of the disc, a first bridge part (for example, first bridge part 141C) provided across an outer circumferential side of the disc, positioned on the first pin disposition part side in the circumferential direction of the disc, and on which a sprue mark (for example, sprue mark 191C) formed at the time of casting the caliper main body part is provided, and a second bridge part (for example, second bridge part 142C) provided across an outer circumferential side of the disc and positioned on the second pin disposition part side in the circumferential direction of the disc, and has a shape in which a cross-sectional area of the caliper main body part on the second bridge part side is larger than a cross-sectional area of the caliper main body part on the first bridge part side when the caliper main body part is divided by a straight line that bisects a line segment connecting a center of the first pin disposition part and a center of the second pin disposition part when viewed from the axial direction of the disc.

According to a seventh aspect, in the sixth aspect, the first bridge part is a section between an opening end portion (for example, opening end portion 132) of the cylinder hole (for example, cylinder hole 131) facing the first friction pad and a pressing part (for example, pressing part 123) of the second friction pad in the axial direction of the disc, the second bridge part is the section, and the cross-sectional area is obtained from a cross section of the section.

An eighth aspect is a brake caliper, which is a brake caliper (for example, brake caliper 21, 21A, 21B, 21C) pressing a friction pad (for example, first friction pad 26, second friction pad 27) to a disc (for example, disc 11), including a first slide pin (for example, first slide pin 102), a second slide pin (for example, second slide pin 103), and a caliper main body part (for example, caliper main body part 101, 101A, 101B, 101C), in which the caliper main body part includes a cylinder part (for example, cylinder part 121, 121A) having a cylinder hole (for example, cylinder hole 131) in which a piston (for example, piston 111) is accommodated, a first pin disposition part (for example, first pin disposition part 124) provided on one end side of the cylinder part in a circumferential direction of the disc and having the first slide pin provided in an axial direction of the disc, a second pin disposition part (for example, second pin disposition part 125) provided on the other end side of the cylinder part in the circumferential direction of the disc and having the second slide pin provided in the axial direction of the disc, a first bridge part (for example, first bridge part 141, 141A, 141B, 141C) provided across an outer circumferential side of the disc, positioned on the first pin disposition part side in the circumferential direction of the disc, and on which a sprue mark (for example, sprue mark 191, 191A, 191B, 191C) formed at the time of casting the caliper main body part is provided, and a second bridge part (for example, second bridge part 142, 142B, 142C) provided across an outer circumferential side of the disc and positioned on the second pin disposition part side in the circumferential direction of the disc, and has a shape in which a moment of inertia of area of the caliper main body part on the first bridge part side is larger than a moment of inertia of area of the caliper main body part on the second bridge part side when the caliper main body part is divided by a straight line that bisects a line segment connecting a center of the first pin disposition part and a center of the second pin disposition part when viewed from the axial direction of the disc.

A ninth aspect is a brake caliper, which is a brake caliper (for example, brake caliper 21C) pressing a friction pad (for example, first friction pad 26, second friction pad 27) to a disc (for example, disc 11), including a first slide pin (for example, first slide pin 102), a second slide pin (for example, second slide pin 103), and a caliper main body part (for example, caliper main body part 101C), in which the caliper main body part includes a cylinder part (for example, cylinder part 121A) having a cylinder hole (for example, the cylinder hole 131) in which a piston is accommodated, a first pin disposition part (for example, first pin disposition part 124) provided on one end side of the cylinder part in a circumferential direction of the disc and having the first slide pin provided in the axial direction of the disc, a second pin disposition part (for example, second pin disposition part 125) provided on the other end side of the cylinder part in the circumferential direction of the disc and having the second slide pin provided in the axial direction of the disc, a first bridge part (for example, first bridge part 141C) provided across an outer circumferential side of the disc, positioned on the first pin disposition part side in the circumferential direction of the disc, and on which a sprue mark (for example, sprue mark 191C) formed at the time of casting the caliper main body part is provided, and a second bridge part (for example, second bridge part 142C) provided across an outer circumferential side of the disc and positioned on the second pin disposition part side in the circumferential direction of the disc, and has a shape in which a cross-sectional area of the caliper main body part on the second bridge part side is larger than a cross-sectional area of the caliper main body part on the first bridge part side when the caliper main body part is divided by a straight line that bisects a line segment connecting a center of the first pin disposition part and a center of the second pin disposition part when viewed from the axial direction of the disc.

A tenth aspect is a method for casting a brake caliper, which is a method for casting a brake caliper (for example, brake caliper 21, 21A, 21B, 21C) pressing a friction pad (for example, first friction pad 26, second friction pad 27) to a disc (for example, disc 11), including a first step, and a second step, in which the first step is a step of preparing a mold (for example, mold 181, 181A, 181B, 181C) for a caliper main body part which is a caliper main body part (for example, caliper main body part 101, 101A, 101B, 101C) including a cylinder part (for example, cylinder part 121, 121A) having a cylinder hole (for example, cylinder hole 131) in which a piston (for example, piston 111) is accommodated, a first pin disposition part (for example, first pin disposition part 124) provided on one end side of the cylinder part in a circumferential direction of the disc and having a first slide pin (for example, first slide pin 102) provided in an axial direction of the disc, a second pin disposition part (for example, second pin disposition part 125) provided on the other end side of the cylinder part in the circumferential direction of the disc and having a second slide pin (for example, second slide pin 103) provided in the axial direction of the disc, a first bridge part (for example, first bridge part 141, 141A, 141B, 141C) provided across an outer circumferential side of the disc and positioned on the first pin disposition part side in the circumferential direction of the disc, and a second bridge part (for example, second bridge part 142, 142B, 142C) provided across an outer circumferential side of the disc and positioned on the second pin disposition part side in the circumferential direction of the disc, and having a shape in which a moment of inertia of area of the caliper main body part on the first bridge part side is larger than a moment of inertia of area of the caliper main body part on the second bridge part side when the caliper main body part is divided by a straight line that bisects a line segment connecting a center of the first pin disposition part and a center of the second pin disposition part when viewed from the axial direction of the disc, and the second step is a step of pouring a molten metal into the mold from the first bridge part side.

An eleventh aspect is a method for casting a brake caliper, which is a method for casting a brake caliper (for example, brake caliper 21C) pressing a friction pad (for example, first friction pad 26, second friction pad 27) to a disc (for example, disc 11), including a first step, and a second step, in which the first step is a step of preparing a mold (for example, mold 181C) for a caliper main body part which is a caliper main body part (for example, caliper main body part 101C) including a cylinder part (for example, cylinder part 121A) having a cylinder hole (for example, cylinder hole 131) in which a piston (for example, piston 111) is accommodated, a first pin disposition part (for example, first pin disposition part 124) provided on one end side of the cylinder part in a circumferential direction of the disc and having a first slide pin (for example, first slide pin 102) provided in an axial direction of the disc, a second pin disposition part (for example, second pin disposition part 125) provided on the other end side of the cylinder part in the circumferential direction of the disc and having a second slide pin (for example, second slide pin 103) provided in the axial direction of the disc, a first bridge part (for example, first bridge part 141C) provided across an outer circumferential side of the disc and positioned on the first pin disposition part side in the circumferential direction of the disc, and a second bridge part (for example, second bridge part 142C) provided across an outer circumferential side of the disc and positioned on the second pin disposition part side in the circumferential direction of the disc, and having a shape in which a cross-sectional area of the caliper main body part on the second bridge part side is larger than a cross-sectional area of the caliper main body part on the first bridge part side when the caliper main body part is divided by a straight line that bisects a line segment connecting a center of the first pin disposition part and a center of the second pin disposition part when viewed from the axial direction of the disc, and the second step is a step of pouring a molten metal into the mold from the first bridge part side.

A twelfth aspect includes a brake caliper (for example, brake caliper 21) including a first friction pad (for example, first friction pad 26) disposed to face one surface (for example, surface 11*a*) of a disc (for example, disc 11) in an axial direction, a second friction pad (for example, second friction pad 27) disposed to face the other surface (for example, surface 11*b*) of the disc in the axial direction, and a caliper main body part (for example, caliper main body part 101) in which a first slide pin (for example, first slide pin 102), a second slide pin (for example, second slide pin 103), and a piston (for example, piston 111) which presses the first friction pad are accommodated in the axial direction of the disc, in which the caliper main body part has a cylinder part (for example, cylinder part 121) having a cylinder hole (for example, cylinder hole 131) in which the piston is accommodated, a first pin disposition part (for example, first pin disposition part 124) provided on one end side of the cylinder part in a circumferential direction of the disc and having the first slide pin provided in the axial direction of the disc, and a second pin disposition part (for example, second pin disposition part 125) provided on the other end side of the cylinder part in the circumferential direction of the disc and having the second slide pin provided in the axial direction of the disc, and a brake carrier, which is a brake carrier (for example, brake carrier 20D, 20E) having the first friction pad and the second friction pad to be movable, fixed to a non-rotating portion of a vehicle, and provided across an outer circumferential side of the disc, including a first fixing part (for example, first fixing part 42) provided to face the one surface and configured to fix the brake carrier to the non-rotating portion of the vehicle, a second fixing part (for example, second fixing part 44) provided to face the one surface and configured to fix the brake carrier to the non-rotating portion of the vehicle, a first connection part (for example, first connection part 46D, 46E) extending in a direction of the first pin disposition part from the first fixing part in a plane perpendicular to the axial direction of the disc and on which a sprue mark (for example, sprue mark 231D, 231E) formed at the time of casting the brake carrier is provided, and a second connection part (for example, second connection part 47) extending in a direction of the second pin disposition part from the second fixing part in a plane perpendicular to the axial direction of the disc, and having a shape in which a moment of inertia of area of the first connection part is larger than a moment of inertia of area of the second connection part.

According to a thirteenth aspect, in the twelfth aspect, a direction of the moment of inertia of area is a direction in which the brake carrier elastically deforms in a rotation direction of the disc when the vehicle travels forward.

According to a fourteenth aspect, in the thirteenth aspect, the brake carrier includes a beam part (for example, inner beam part 45) connecting the first fixing part and the second fixing part, the first connection part is positioned in a first section on an outer side of the beam part and on an inner side of the first pin disposition part in a radial direction of the disc, the second connection part is positioned in a second section on an outer side of the beam part and on an inner side of the second pin disposition part in the radial direction of the disc, and the moment of inertia of area of the first connection part is obtained from a cross section of the first section and the moment of inertia of area of the second connection part is obtained from a cross section of the second section.

According to a fifteenth aspect, in the fourteenth aspect, the first connection part is on a rotation exit side in the rotation direction of the disc when the vehicle travels forward.

According to a sixteenth aspect, in the fourteenth aspect, the first connection part includes a rib (for example, rib 211D) protruding in a direction away from the first friction pad in the axial direction of the disc.

According to a seventeenth aspect, in the fourteenth aspect, a width of the first connection part (for example, first connection part 46E) in an extending direction of the beam part is larger than a width of the second connection part (for example, second connection part 47) in the extending direction of the beam part in a plane in the axial direction of the disc.

An eighteenth aspect includes a brake caliper (for example, brake caliper 21) including a first friction pad (for example, first friction pad 26) disposed to face one surface (for example, surface 11*a*) of a disc (for example, disc 11) in an axial direction, a second friction pad (for example, second friction pad 27) disposed to face the other surface (for example, surface 11*b*) of the disc in the axial direction, and a caliper main body part (for example, caliper main body part 101) in which a first slide pin (for example, first slide pin 102), a second slide pin (for example, second slide pin 103), and a piston (for example, piston 111) which presses the first friction pad are accommodated in the axial direction of the disc, in which the caliper main body part has a cylinder part (for example, cylinder part 121) having a cylinder hole (for example, cylinder hole 131) in which the piston is accommodated, a first pin disposition part (for example, first pin disposition part 124) provided on one end side of the cylinder part in a circumferential direction of the disc and having the first slide pin provided in the axial direction of the disc, and a second pin disposition part (for example, second pin disposition part 125) provided on the other end side of the cylinder part in the circumferential direction of the disc and having the second slide pin provided in the axial direction of the disc, and a brake carrier, which is a brake carrier (for example, brake carrier 20F) having the first friction pad and the second friction pad to be movable, fixed to a non-rotating portion of a vehicle, and provided across an outer circumferential side of the disc, including a first fixing part (for example, first fixing part 42) provided to face the one surface and configured to fix the brake carrier to the non-rotating portion of the vehicle, a second fixing part (for example, second fixing part 44) provided to face the one surface and configured to fix the brake carrier to the non-rotating portion of the vehicle, a first connection part (for example, first connection part 46) extending in a direction of the first pin disposition part from the first fixing part in a plane perpendicular to the axial direction of the disc and on which a sprue mark (for example, sprue mark 231F) formed at the time of casting the brake carrier is provided, and a second connection part (for example, second connection part 47F) extending in a direction of the second pin disposition part from the second fixing part in a plane perpendicular to the axial direction of the disc, and having a shape in which a cross-sectional area of the second connection part is larger than a cross-sectional area of the first connection part.

According to a nineteenth aspect, in the eighteenth aspect, the brake carrier includes a beam part (for example, inner beam part 45) connecting the first fixing part and the second fixing part, the first connection part is positioned in a first section on an outer side of the beam part and on an inner side of the first pin disposition part in a radial direction of the disc, the second connection part is positioned in a second section on an outer side of the beam part and on an inner side of the second pin disposition part in the radial direction of the disc, and the cross-sectional area of the first connection part is obtained from a cross section of the first section and the cross-sectional area of the second connection part is obtained from a cross section of the second section.

According to a twentieth aspect, in the nineteenth aspect, the second connection part is on a rotation exit side in a rotation direction of the disc when the vehicle travels forward.

A twenty-first aspect is a brake carrier, which is a brake carrier (for example, brake carrier 20D, 20E) having a first friction pad (for example, first friction pad 26) disposed to face one surface (for example, surface 11*a*) of a disc (for example, disc 11) in an axial direction and a second friction pad (for example, second friction pad 27) disposed to face the other surface (for example, surface 11*b*) of the disc in the axial direction to be movable, fixed to a non-rotating portion of a vehicle, and provided across an outer circumferential side of the disc, including a first fixing part (for example, first fixing part 42) provided to face the one surface and configured to fix the brake carrier to the non-rotating portion of the vehicle, a second fixing part (for example, second fixing part 44) provided to face the one surface and configured to fix the brake carrier to the non-rotating portion of the vehicle, a first connection part (for example, first connection part 46D, 46E) extending from the first fixing part in a plane perpendicular to the axial direction of the disc and on which a sprue mark (for example, sprue mark 231D, 231E) formed at the time of casting the brake carrier is provided, and a second connection part (for example, second connection part 47) extending from the second fixing part in a plane perpendicular to the axial direction of the disc, and having a shape in which a moment of inertia of area of the first connection part is larger than a moment of inertia of area of the second connection part.

A twenty-second aspect is a brake carrier, which is a brake carrier (for example, brake carrier 20F) having a first friction pad (for example, first friction pad 26) disposed to face one surface (for example, surface 11*a*) of a disc (for example, disc 11) in an axial direction and a second friction pad (for example, second friction pad 27) disposed to face the other surface (for example, surface 11*b*) of the disc in the axial direction to be movable, fixed to a non-rotating portion of a vehicle, and provided across an outer circumferential side of the disc, including a first fixing part (for example, first fixing part 42) provided to face the one surface and configured to fix the brake carrier to the non-rotating portion of the vehicle, a second fixing part (for example, second fixing part 44) provided to face the one surface and configured to fix the brake carrier to the non-rotating portion of the vehicle, a first connection part (for example, first connection part 46) extending from the first fixing part in a plane perpendicular to the axial direction of the disc and on which a sprue mark (for example, sprue mark 231F) formed at the time of casting the brake carrier is provided, and a second connection part (for example, second connection part 47F) extending from the second fixing part in a plane perpendicular to the axial direction of the disc, and having a shape in which a cross-sectional area of the second connection part is larger than a cross-sectional area of the first connection part.

A twenty-third aspect is a method for casting a brake carrier, which is a method for casting a brake carrier (for example, brake carrier 20D, 20E) having a first friction pad (for example, first friction pad 26) disposed to face one surface (for example, surface 11*a*) of a disc (for example, disc 11) in an axial direction and a second friction pad (for example, second friction pad 27) disposed to face the other surface (for example, surface 11*b*) of the disc in the axial direction to be movable, fixed to a non-rotating portion of a vehicle, and provided across an outer circumferential side of the disc, including a first step, and a second step, in which the first step is a step of preparing a mold (for example, mold 221D, 221E) for a brake carrier which is a brake carrier including a first fixing part (for example, first fixing part 42) provided to face the one surface and configured to fix the brake carrier to the non-rotating portion of the vehicle, a second fixing part (for example, second fixing part 44) provided to face the one surface and configured to fix the brake carrier to the non-rotating portion of the vehicle, a first connection part (for example, first connection part 46D, 46E) extending from the first fixing part in a plane perpendicular to the axial direction of the disc and on which a sprue mark (for example, sprue mark 231D, 231E) formed at the time of casting the brake carrier is provided, and a second connection part (for example, second connection part 47) extending from the second fixing part in a plane perpendicular to the axial direction of the disc, and having a shape in which a moment of inertia of area of the first connection part is larger than a moment of inertia of area of the second connection part, and the second step is a step of pouring a molten metal into the mold from the first connection part side.

A twenty-fourth aspect is a method for casting a brake carrier, which is a method for casting a brake carrier (for example, brake carrier 20F) having a first friction pad (for example, first friction pad 26) disposed to face one surface (for example, surface 11*a*) of a disc (for example, disc 11) in an axial direction and a second friction pad (for example, second friction pad 27) disposed to face the other surface (for example, surface 11*b*) of the disc in the axial direction to be movable, fixed to a non-rotating portion of a vehicle, and provided across an outer circumferential side of the disc, including a first step, and a second step, in which the first step is a step of preparing a mold (for example, mold 221F) for a brake carrier which is a brake carrier including a first fixing part (for example, first fixing part 42) provided to face the one surface and configured to fix the brake carrier to the non-rotating portion of the vehicle, a second fixing part (for example, second fixing part 44) provided to face the one surface and configured to fix the brake carrier to the non-rotating portion of the vehicle, a first connection part (for example, first connection part 46) extending from the first fixing part in a plane perpendicular to the axial direction of the disc and on which a sprue mark (for example, sprue mark 231F) formed at the time of casting the brake carrier is provided, and a second connection part (for example, second connection part 47F) extending from the second fixing part in a plane perpendicular to the axial direction of the disc, and having a shape in which a cross-sectional area of the second connection part is larger than a cross-sectional area of the first connection part, and the second step is a step of pouring a molten metal into the mold from the first connection part side.

REFERENCE SIGNS LIST

10, 10A to 10F Disc brake
11 Disc
11*a*, 11*b* Surface
20, 20D, 20E, 20F Brake carrier
21, 21A, 21B, 21C Brake caliper
26 First friction pad
27 Second friction pad
42 First fixing part
44 Second fixing part
46, 46D, 46E First connection part
47, 47F Second connection part
101, 101A, 101B, 101C Caliper main body part
102 First slide pin
103 Second slide pin
111 Piston
121, 121A Cylinder part
123 Pressing part
124 First pin disposition part
125 Second pin disposition part
131 Cylinder hole
132 Opening end portion
141, 141A, 141B, 141C First bridge part
142, 142B, 142C Second bridge part
171A Rib
181, 181A, 181B, 181C Mold
191, 191A, 191B, 191C Sprue mark
205B Cast-out part
211D Rib
221D, 221E, 221F Mold
231D, 231E, 231F Sprue mark

The invention claimed is:

1. A disc brake comprising:

a brake carrier fixed to a non-rotating portion of a vehicle and provided across an outer circumferential side of a disc;

a first friction pad provided to be movable in the brake carrier and disposed to face one surface of the disc in an axial direction;

a second friction pad provided to be movable in the brake carrier and disposed to face the other surface of the disc in the axial direction; and a brake caliper, which is a brake caliper in which a piston pressing the first friction pad is accommodated in the axial direction of the disc, including a first slide pin, a second slide pin, and a caliper main body part supported by the brake carrier via the first slide pin and the second slide pin, wherein the caliper main body part includes:

a cylinder part having a cylinder hole in which the piston is accommodated;

a first pin disposition part provided on one end side of the cylinder part in a circumferential direction of the disc and having the first slide pin provided in the axial direction of the disc;

a second pin disposition part provided on the other end side of the cylinder part in the circumferential direction of the disc and having the second slide pin provided in the axial direction of the disc;

a first bridge part provided across an outer circumferential side of the disc, positioned on the first pin disposition part side in the circumferential direction of the disc, and on which a sprue mark formed at the time of casting the caliper main body part is provided; and a second bridge part provided across an outer circumferential side of the disc and positioned on the second pin disposition part side in the circumferential direction of the disc, and wherein the caliper main body part has a shape in which a moment of inertia of area of the caliper main body part on the first bridge part side is larger than a moment of inertia of area of the caliper main body part on the second bridge part side when the caliper main body part is divided by a straight line that bisects a line segment connecting a center of the first pin disposition part and a center of the second pin disposition part when viewed from the axial direction of the disc.

2. The disc brake according to claim 1, wherein a direction of the moment of inertia of area is a direction in which the caliper main body part elastically deforms in the axial direction of the disc.

3. The disc brake according to claim 2, wherein the first bridge part is a section between an opening end portion of the cylinder hole facing the first friction pad and a pressing part of the second friction pad in the axial direction of the disc, the second bridge part is a section between an opening end portion of the cylinder hole facing the first friction pad and a pressing part of the second friction pad in the axial direction of the disc, and the moment of inertia of area is obtained from a cross section of the section.

4. The disc brake according to claim 3, wherein the first bridge part includes a rib protruding in a direction away from the first friction pad in a plane perpendicular to the axial direction of the disc.

5. The disc brake according to claim 3, wherein the second bridge part includes a cast-out part on a side in a direction toward the first friction pad in a plane perpendicular to the axial direction of the disc.

6. A brake caliper, which is a brake caliper pressing a friction pad to a disc, comprising:

a first slide pin;

a second slide pin; and a caliper main body part, wherein the caliper main body part includes:

a cylinder part having a cylinder hole in which a piston is accommodated;

a first pin disposition part provided on one end side of the cylinder part in a circumferential direction of the disc and having the first slide pin provided in an axial direction of the disc;

a second pin disposition part provided on the other end side of the cylinder part in the circumferential direction of the disc and having the second slide pin provided in the axial direction of the disc;

a first bridge part provided across an outer circumferential side of the disc, positioned on the first pin disposition part side in the circumferential direction of the disc, and on which a sprue mark formed at the time of casting the caliper main body part is provided; and a second bridge part provided across an outer circumferential side of the disc and positioned on the second pin disposition part side in the circumferential direction of the disc, and wherein the caliper main body part has a shape in which a moment of inertia of area of the caliper main body part on the first bridge part side is larger than a moment of inertia of area of the caliper main body part on the second bridge part side when the caliper main body part is divided by a straight line that bisects a line segment connecting a center of the first pin disposition part and a center of the second pin disposition part when viewed from the axial direction of the disc.

7. A disc brake comprising:

a brake caliper including:

a first friction pad disposed to face one surface of a disc in an axial direction;

a second friction pad disposed to face the other surface of the disc in the axial direction; and a caliper main body part in which a first slide pin, a second slide pin, and a piston which presses the first friction pad are accommodated in the axial direction of the disc, wherein the caliper main body part has:

a cylinder part having a cylinder hole in which the piston is accommodated;

a first pin disposition part provided on one end side of the cylinder part in a circumferential direction of the disc and having the first slide pin provided in the axial direction of the disc; and a second pin disposition part provided on the other end side of the cylinder part in the circumferential direction of the disc and having the second slide pin provided in the axial direction of the disc; and a brake carrier, which is a brake carrier having the first friction pad and the second friction pad to be movable, fixed to a non-rotating portion of a vehicle, and provided across an outer circumferential side of the disc, including:

a first fixing part provided to face the one surface and configured to fix the brake carrier to the non-rotating portion of the vehicle;

a second fixing part provided to face the one surface and configured to fix the brake carrier to the non-rotating portion of the vehicle;

a first connection part extending in a direction of the first pin disposition part from the first fixing part in a plane perpendicular to the axial direction of the disc and on which a sprue mark formed at the time of casting the brake carrier is provided; and a second connection part extending in a direction of the second pin disposition part from the second fixing part in a plane perpendicular to the axial direction of the disc, and wherein the brake carrier has a shape in which a moment of inertia of area of the first connection part is larger than a moment of inertia of area of the second connection part.

8. The disc brake according to claim 7, wherein a direction of the moment of inertia of area is a direction in which the brake carrier elastically deforms in a rotation direction of the disc when the vehicle travels forward.

9. The disc brake according to claim 8, wherein the brake carrier includes a beam part connecting the first fixing part and the second fixing part, the first connection part is positioned in a first section on an outer side of the beam part and on an inner side of the first pin disposition part in a radial direction of the disc, the second connection part is positioned in a second section on an outer side of the beam part and on an inner side of the second pin disposition part in the radial direction of the disc, and the moment of inertia of area of the first connection part is obtained from a cross section of the first section and the moment of inertia of area of the second connection part is obtained from a cross section of the second section.

10. The disc brake according to claim 9, wherein the first connection part is on a rotation exit side in the rotation direction of the disc when the vehicle travels forward.

11. The disc brake according to claim 9, wherein the first connection part includes a rib protruding in a direction away from the first friction pad in the axial direction of the disc.

12. The disc brake according to claim 9, wherein a width of the first connection part in an extending direction of the beam part is larger than a width of the second connection part in the extending direction of the beam part in a plane in the axial direction of the disc.

13. A brake carrier, which is a brake carrier including a first friction pad disposed to face one surface of a disc in an axial direction and a second friction pad disposed to face the other surface of the disc in the axial direction to be movable, fixed to a non-rotating portion of a vehicle, and provided across an outer circumferential side of the disc, the brake carrier comprising:

a first fixing part provided to face the one surface and configured to fix the brake carrier to the non-rotating portion of the vehicle;

a second fixing part provided to face the one surface and configured to fix the brake carrier to the non-rotating portion of the vehicle;

a first connection part extending from the first fixing part in a plane perpendicular to the axial direction of the disc and on which a sprue mark formed at the time of casting the brake carrier is provided, and a second connection part extending from the second fixing part in a plane perpendicular to the axial direction of the disc, and wherein the brake carrier has a shape in which a moment of inertia of area of the first connection part is larger than a moment of inertia of area of the second connection part.

* * * * *